United States Patent
Lipper McCauley

(10) Patent No.: US 10,172,457 B2
(45) Date of Patent: *Jan. 8, 2019

(54) ROLLABLE DRAWER SYSTEM AND ROLLABLE APPLIANCE SUPPORT SYSTEM

(71) Applicant: Lipper International, Inc., Wallingford, CT (US)

(72) Inventor: Amy Lipper McCauley, Wallingford, CT (US)

(73) Assignee: LIPPER INTERNATIONAL, INC., Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,525

(22) Filed: Jun. 30, 2017

(65) Prior Publication Data
US 2018/0132614 A1 May 17, 2018

Related U.S. Application Data

(63) Continuation-in-part of application No. 14/989,399, filed on Jan. 6, 2016.

(51) Int. Cl.
*A47B 88/41* (2017.01)
*A47B 88/48* (2017.01)
(Continued)

(52) U.S. Cl.
CPC ............ *A47B 88/41* (2017.01); *A47B 88/483* (2017.01); *A47B 2088/901* (2017.01);
(Continued)

(58) Field of Classification Search
CPC ............... Y10T 16/193; Y10T 16/1937; Y10T 16/1943; B60B 33/04; B60B 33/06;
(Continued)

(56) References Cited

U.S. PATENT DOCUMENTS 145,011 A    11/1873   Proctor
343,511 A *   6/1886   White .................. B60B 33/06
                                                      126/304 A
(Continued)

FOREIGN PATENT DOCUMENTS

DE     3406581 A    8/1985
DE     3406581 A1   8/1985
(Continued)

OTHER PUBLICATIONS

European Search Report dated Jun. 1, 2017 from corresponding European Application No. EP 17000002.
(Continued)

*Primary Examiner* — Andrew M Roersma
(74) *Attorney, Agent, or Firm* — Lucas & Mercanti, LLP

(57) ABSTRACT

An apparatus includes first and second side portions, and a horizontal portion disposed between the first and second side portions. Each side portion includes an inner wall joined to the horizontal surface, an exterior wall, and a top portion connected that define a volume within the side portion. Each side portion also includes first and second wheels within the volume, the first and second wheels having a raised wheel position and a lowered wheel position. Each side portion also has an arm coupled to the outer wall of the side portion, the arm having a first arm position and a second arm position. Movement of the arm from the first arm position to the second arm position causes the wheels to move from the raised wheel position to the lowered wheel position.

9 Claims, 27 Drawing Sheets

(51) Int. Cl.
*A47B 88/483* (2017.01)
*A47B 88/90* (2017.01)

(52) U.S. Cl.
CPC ....... *A47B 2210/01* (2013.01); *A47B 2210/04* (2013.01); *A47B 2210/07* (2013.01)

(58) Field of Classification Search
CPC .. B60B 33/066; A61G 7/1046; A61G 7/1048; A47J 47/00; A47J 47/16; A47J 36/34; A47J 2043/04454; A47B 37/00; A47B 2210/17; A47B 88/90; A47B 46/00; A47B 77/18; A47B 91/02; A47B 2025/006; A47B 2200/0038; F16M 11/046; F16M 11/42

See application file for complete search history.

(56) References Cited

U.S. PATENT DOCUMENTS

| | | | | |
|---|---|---|---|---|
| 935,289 | A * | 9/1909 | Wood | B60B 33/06 16/34 |
| 1,426,328 | A * | 8/1922 | Tiffany | B60B 33/06 280/43.14 |
| 2,042,489 | A * | 6/1936 | Williams | B60B 33/06 16/33 |
| 2,192,337 | A | 3/1940 | Tiffany | |
| 2,624,590 | A | 1/1953 | Tilton | |
| 2,783,055 | A * | 2/1957 | Michaud | B62B 3/0625 16/34 |
| 2,841,410 | A * | 7/1958 | Kessler, Jr. | B60B 33/06 280/43.15 |
| 2,843,392 | A | 7/1958 | Simpkins | |
| 2,878,029 | A * | 3/1959 | Dalmen | B65D 25/20 280/43.1 |
| 2,993,740 | A | 7/1961 | Good | |
| 3,663,982 | A * | 5/1972 | Hayden | B05C 21/00 15/248.2 |
| 3,782,750 | A * | 1/1974 | Peters | B62B 3/06 104/34 |
| 4,378,191 | A | 3/1983 | Sato | |
| 4,892,302 | A * | 1/1990 | Daigle | A63B 5/00 473/440 |
| 5,449,266 | A | 9/1995 | Evans | |
| 6,276,423 | B1 * | 8/2001 | Goracy | B60C 25/02 157/1.17 |
| D560,090 | S | 1/2008 | Chung | |
| D628,444 | S | 12/2010 | Snider | |
| D628,445 | S | 12/2010 | Snider | |
| D644,491 | S | 9/2011 | Snider | |
| D659,481 | S | 5/2012 | Tiemann | |
| D660,088 | S | 5/2012 | Tiemann | |
| D661,951 | S | 6/2012 | Tiemann | |
| D665,230 | S | 8/2012 | Snider | |
| D674,213 | S | 1/2013 | Hertaus | |
| D675,849 | S | 2/2013 | Tawil | |
| D676,265 | S | 2/2013 | Tawil | |
| D676,715 | S | 2/2013 | Tsai | |
| D679,954 | S | 4/2013 | Snider | |
| D680,380 | S | 4/2013 | Tiemann | |
| D682,039 | S | 5/2013 | Tiemann | |
| D684,404 | S | 6/2013 | Hertaus | |
| D686,464 | S | 7/2013 | Tiemann | |
| D697,744 | S | 1/2014 | Lipper McCauley | |
| 8,641,060 | B2 | 2/2014 | Starr et al. | |
| 8,657,306 | B2 * | 2/2014 | Chiu | B23Q 1/015 280/43.1 |
| D701,431 | S | 3/2014 | Tsai | |
| D701,733 | S | 4/2014 | Tiemann | |
| D703,002 | S | 4/2014 | Tiemann | |
| D703,003 | S | 4/2014 | Tiemann | |
| D703,005 | S | 4/2014 | Tiemann | |
| D708,906 | S | 7/2014 | Tiemann | |
| D708,907 | S | 7/2014 | Tiemann | |
| D708,908 | S | 7/2014 | Tiemann | |
| D708,909 | S | 7/2014 | Tiemann | |
| D713,691 | S | 9/2014 | Sabounjian | |
| D713,692 | S | 9/2014 | Tsai | |
| D718,578 | S | 12/2014 | Sabounjian | |
| D722,831 | S | 2/2015 | Tuang | |
| 8,974,014 | B1 | 3/2015 | Tiemann et al. | |
| D734,101 | S | 7/2015 | Greenspon | |
| D743,748 | S | 11/2015 | Tiemann et al. | |
| D750,442 | S | 3/2016 | Tiemann et al. | |
| D755,574 | S | 5/2016 | Lee | |
| D764,236 | S | 8/2016 | Hertaus | |
| D778,647 | S | 2/2017 | Snider | |
| D782,868 | S | 4/2017 | Lien | |
| D784,745 | S | 4/2017 | Nilsson et al. | |
| 2005/0258327 | A1 | 11/2005 | Chen | |
| 2012/0024329 | A1 | 2/2012 | Ma | |
| 2014/0009712 | A1 | 1/2014 | Minowa | |
| 2014/0091695 | A1 | 4/2014 | Langois | |
| 2014/0183322 | A1 * | 7/2014 | Starr | F16M 11/42 248/424 |
| 2014/0217876 | A1 | 8/2014 | Tsai | |
| 2017/0188704 | A1 * | 7/2017 | Lipper McCauley | B60B 33/066 |

FOREIGN PATENT DOCUMENTS

| | | | |
|---|---|---|---|
| EP | 0207843 A1 | 1/1987 | |
| FR | 2604426 A1 * | 4/1988 | ............ B60B 33/06 |
| GB | 624303 A | 6/1949 | |
| JP | S60244601 A | 12/1985 | |

OTHER PUBLICATIONS

Extended European Search Report dated Jun. 12, 2017 which includex the Examiner's Opinion based on European Search Report.

* cited by examiner

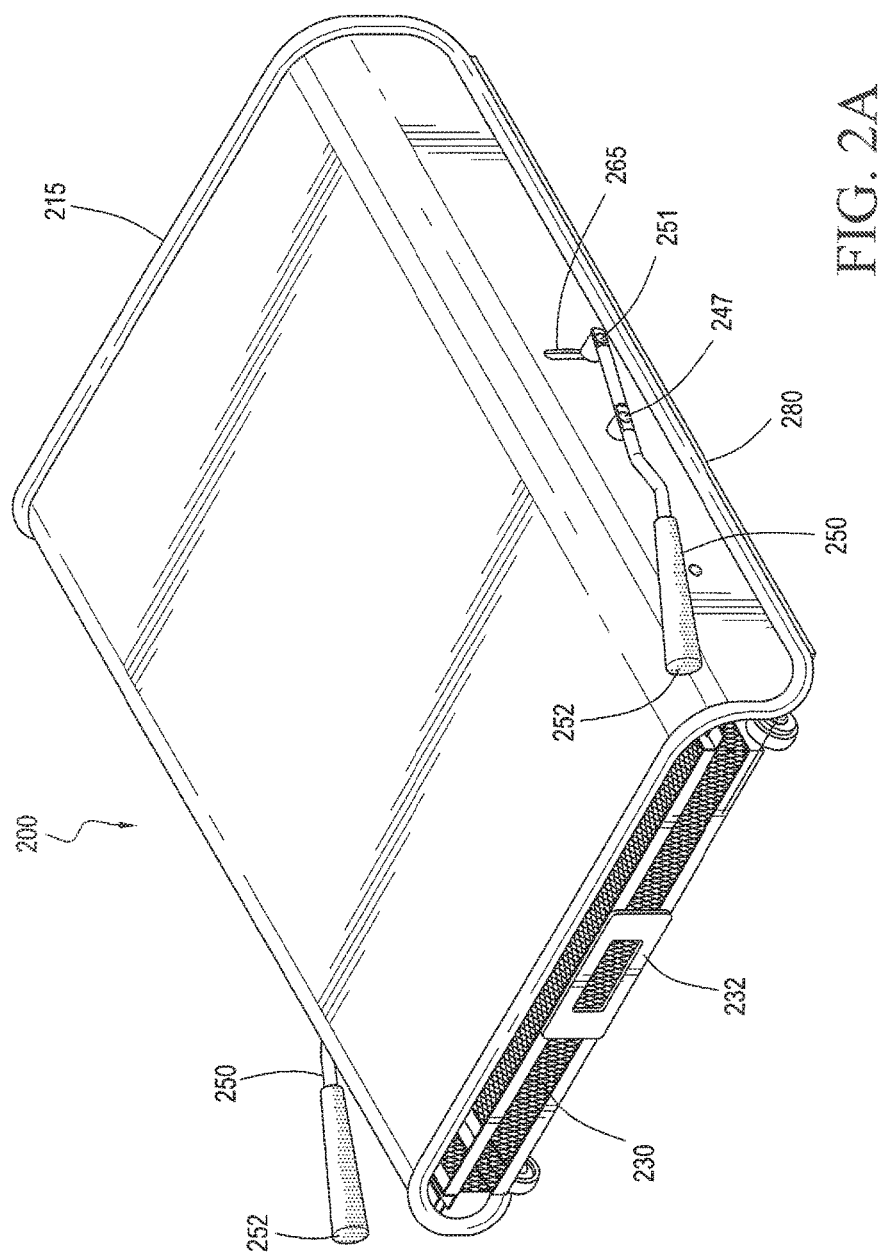

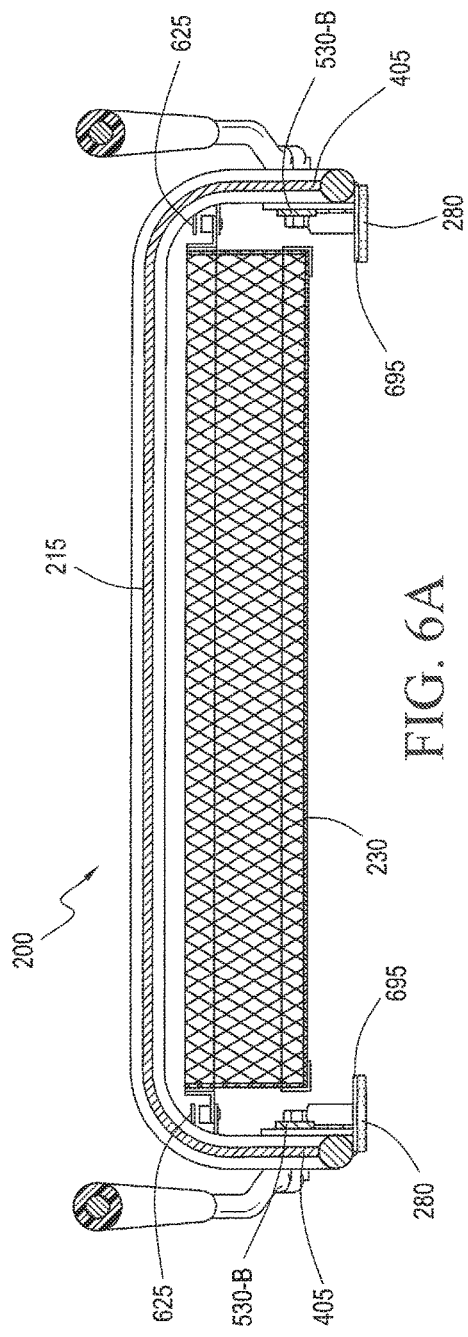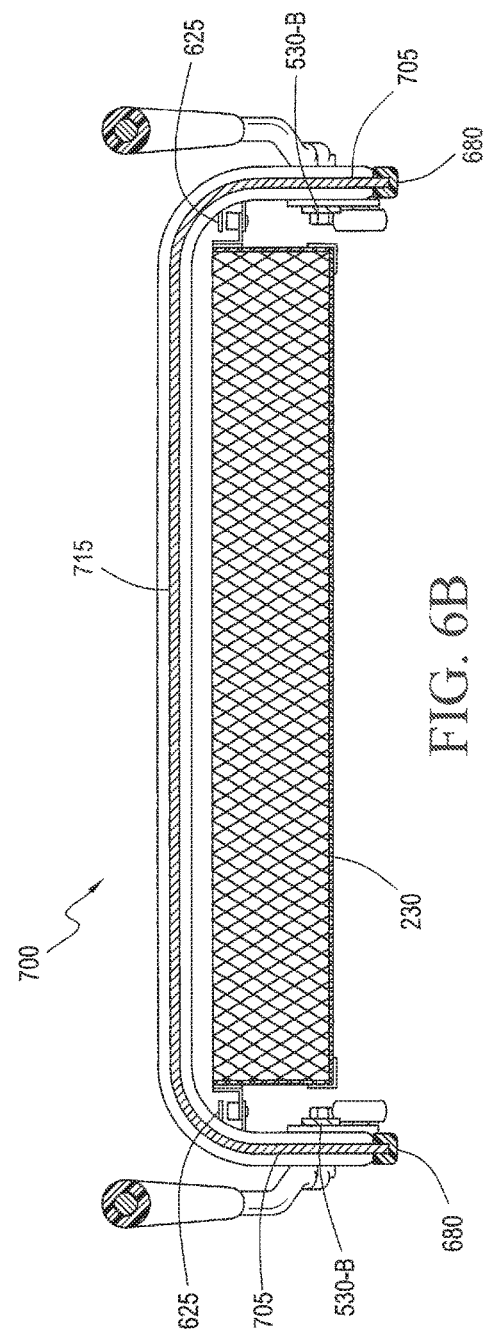

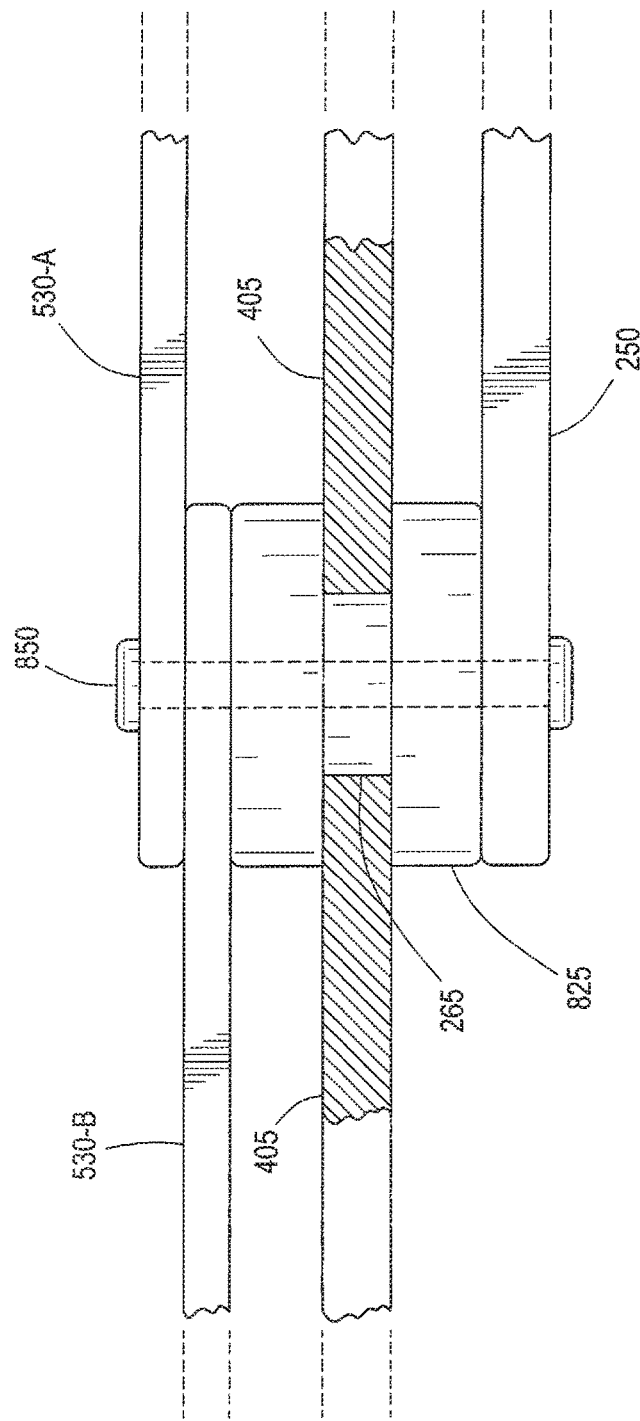

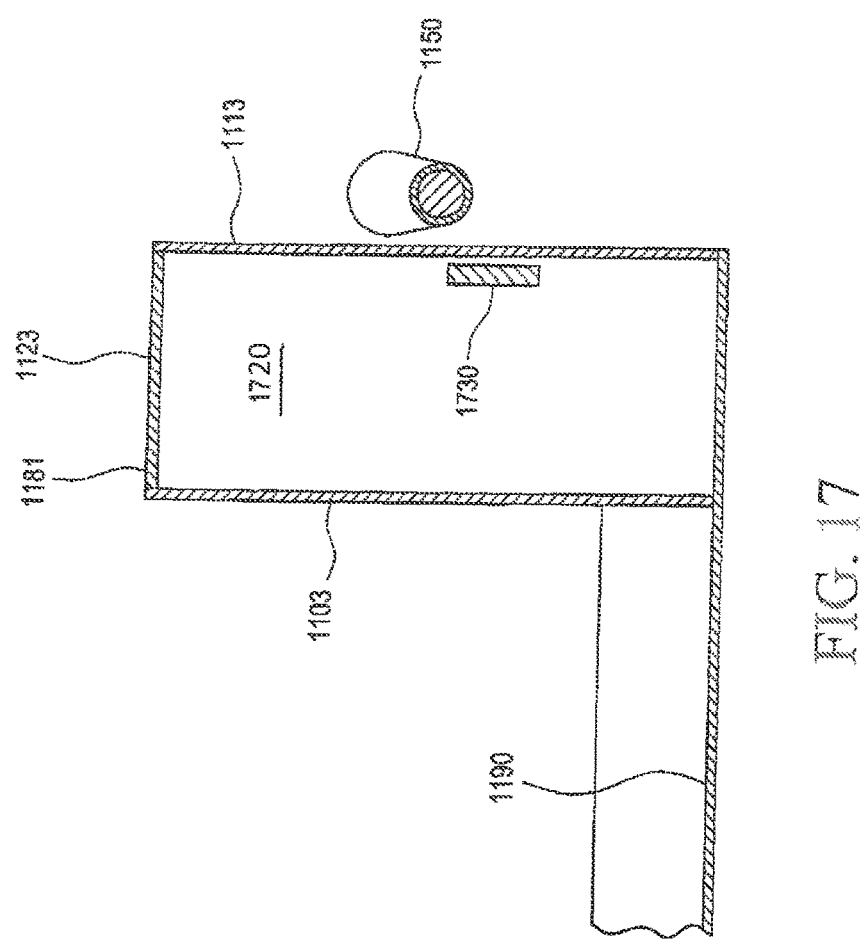

ROLLABLE DRAWER SYSTEM AND ROLLABLE APPLIANCE SUPPORT SYSTEM

This application is a Continuation-in-Part and claims priority to U.S. patent application Ser. No. 14/989,399, filed Jan. 6, 2016, which is incorporated herein by reference.

TECHNICAL FIELD

This specification relates generally to household furniture and appliances, and more particularly to rollable drawer systems and rollable appliance support systems.

BACKGROUND

Drawers are available in many different shapes and sizes. Recently, single-drawer systems have been used in connection with mixing machines and food processors, which are increasingly popular items in homes, offices, and elsewhere. Mixing machines and food processors allow a user to prepare a recipe from selected ingredients quickly and easily.

Many users of a mixing machine or food processor also use a specially-designed countertop drawer designed to hold tools required for the device, such as spoons, whisks, and beaters. In many homes, the mixing machine or food processor is stacked on top of the drawer and stored on a countertop in the kitchen.

SUMMARY

In accordance with an embodiment, an apparatus includes a housing having first and second sides and a bottom surface, and a drawer disposed in the housing. Each of the first and second sides of the housing includes first and second wheels coupled to the housing, the first and second wheels having a first wheel position in which no portion of the first and second wheels is above the bottom surface of the housing and a second wheel position in which a portion of each of the first and second wheels is below the bottom surface of the housing. Each side also includes an arm coupled to the housing, the arm having a first arm position and a second arm position, wherein movement of the arm from the first arm position to the second arm position causes the first and second wheels to move from the first wheel position to the second wheel position.

In one embodiment, each of the first and second sides of the housing further includes a side wall, and a slot defined in the side wall. A portion of the arm is adapted to move between a first location in the slot, the first location being associated with the first arm position, and a second location in the slot, the second location being associated with the second arm position.

In another embodiment, each of the first and second sides further includes a pivot, wherein the arm is fixed on the pivot. The arm pivots on the pivot from the first arm position to the second arm position.

In another embodiment, each of the first and second sides of the housing further includes a first lever coupled to the arm via the slot, a first wheel coupled to the first lever, a second lever coupled to the arm via the slot, and a second wheel coupled to the first lever. Movement of the arm from the first arm position to the second arm position causes the first and second levers to move from a first lever position to a second lever position, thereby causing the first and second wheels to move from the first wheel position to the second wheel position.

In another embodiment, the first lever and the second lever are coupled to the arm by a friction-generating element that is engaged in the slot.

In another embodiment, the arm is disposed on an exterior of the sidewall, and the first and second levers and the first and second wheels are disposed on an interior of the side wall.

In another embodiment, each of the first and second sides of the housing further includes a pad coupled to the side wall. An edge of the pad defines the bottom surface of the housing.

In another embodiment, each of the first and second sides further includes a flange attached to the side wall. The pad is attached to the flange.

In another embodiment, the pad includes one of a plastic material, a foam material, and a cloth material.

In another embodiment, the first and second sides define an opening at a front of the housing, and the drawer is adapted to slide from a first drawer position to a second drawer position through the opening.

In accordance with another embodiment, a rollable drawer system includes a housing that includes a top, and first and second sides, wherein each side includes a wall having an interior, an exterior, and a lower edge. Each side also includes a pair of wheels coupled to the respective wall on the interior of the wall, the pair of wheels having a first wheel position in which the pair of wheels are higher than the lower edge of the respective wall, and a second wheel position in which the pair of wheels are lower than the lower edge of the respective wall. Each side also has an arm coupled to the respective wall on the exterior of the wall, the arm having a first arm position and a second arm position, wherein a movement of the arm from the first position to the second position causes the pair of wheels to move from the first wheel position to the second wheel position. The first and second sides define an opening. A drawer is disposed in the housing, the drawer being adapted to move through the opening of the housing, the drawer having a closed position in which the drawer is fully in the housing and a closed position in which the drawer is removed at least partially from the housing through the opening. The rollable drawer system cannot roll on a surface when a first pair of wheels coupled to the first side are in the first wheel position and a second pair of wheels coupled to the second side are in the first wheel position. The rollable drawer system is adapted to roll on the surface when the first pair of wheels coupled to the first side are in the second wheel position and the second pair of wheels coupled to the second side are in the second wheel position.

In one embodiment, the wall includes a slot, and the arm is engaged in the slot, the arm being adapted to move within the slot, the first position being associated with a first location in the slot and the second position being associated with a second location in the slot.

In another embodiment, each side further includes first and second levers engaged in the slot, wherein a respective first wheel is coupled to the first lever and a respective second wheel is coupled to the second lever. The first and second levers are coupled to the arm, and movement of the arm from the first position to the second position causes the first and second levers to move from a first lever position to a second lever position, wherein movement of the first and second levers causes the pair of wheels to move from the first wheel position to the second wheel position.

In another embodiment, each side further includes a friction-generating element engaged in the slot, wherein the first and second levers are coupled to the friction-generating element, and the arm is also coupled to the friction-generating element.

In another embodiment, each side of the housing further includes a pad having a lower surface, wherein the respective pair of wheels is above the lower surface of the pad when the pair of wheels are in the first wheel position and the pair of wheels are below the lower surface of the pad when the pair of wheels are in the second wheel position.

In another embodiment, the pad includes one of a plastic material, a foam material, and a cloth material.

In accordance with another embodiment, an apparatus includes first and second side portions, and a horizontal portion disposed between the first and second side portions, the horizontal portion having a top surface and a bottom surface. Each of the first and second side portions includes an inner wall joined to the horizontal surface, an exterior wall, and a top portion connected to the inner wall and to the exterior wall, wherein the inner wall, the exterior wall, and the top portion define a volume. Each side portion of the apparatus also includes first and second wheels disposed in the volume within the respective side portion, the first and second wheels having a first wheel position in which no portion of the first and second wheels is above the bottom surface of the horizontal portion and a second wheel position in which a portion of each of the first and second wheels is below the bottom surface of the horizontal portion, and an arm coupled to the respective side portion, the arm being disposed on an exterior of the outer wall, the arm having a first arm position and a second arm position, wherein movement of the arm from the first arm position to the second arm position causes the first and second wheels to move from the first wheel position to the second wheel position.

In one embodiment, the horizontal portion has a pad disposed on the bottom surface of the horizontal portion. A selected surface of the pad defines the bottom surface of the horizontal portion.

In one embodiment, each side portion further includes a pair of openings adapted to allow the first and second wheels to pass between the interior of the side portion and an exterior of the side portion.

These and other advantages of the present disclosure will be apparent to those of ordinary skill in the art by reference to the following Detailed Description and the accompanying drawings.

BRIEF DESCRIPTION OF THE DRAWINGS

FIGS. 2A, 2B and 3 show a rollable drawer system in accordance with an embodiment;

FIG. 6A shows a cross-section of a rollable drawer system in accordance with an embodiment;

FIG. 6B shows a cross-section of a rollable drawer system in accordance with another embodiment;

FIG. 8 shows a cross-section of a side wall of a rollable drawer system in accordance with an embodiment;

FIG. 17 shows a cross section of a side portion of the rollable support system of FIG. 16.

DETAILED DESCRIPTION

Figure 1:
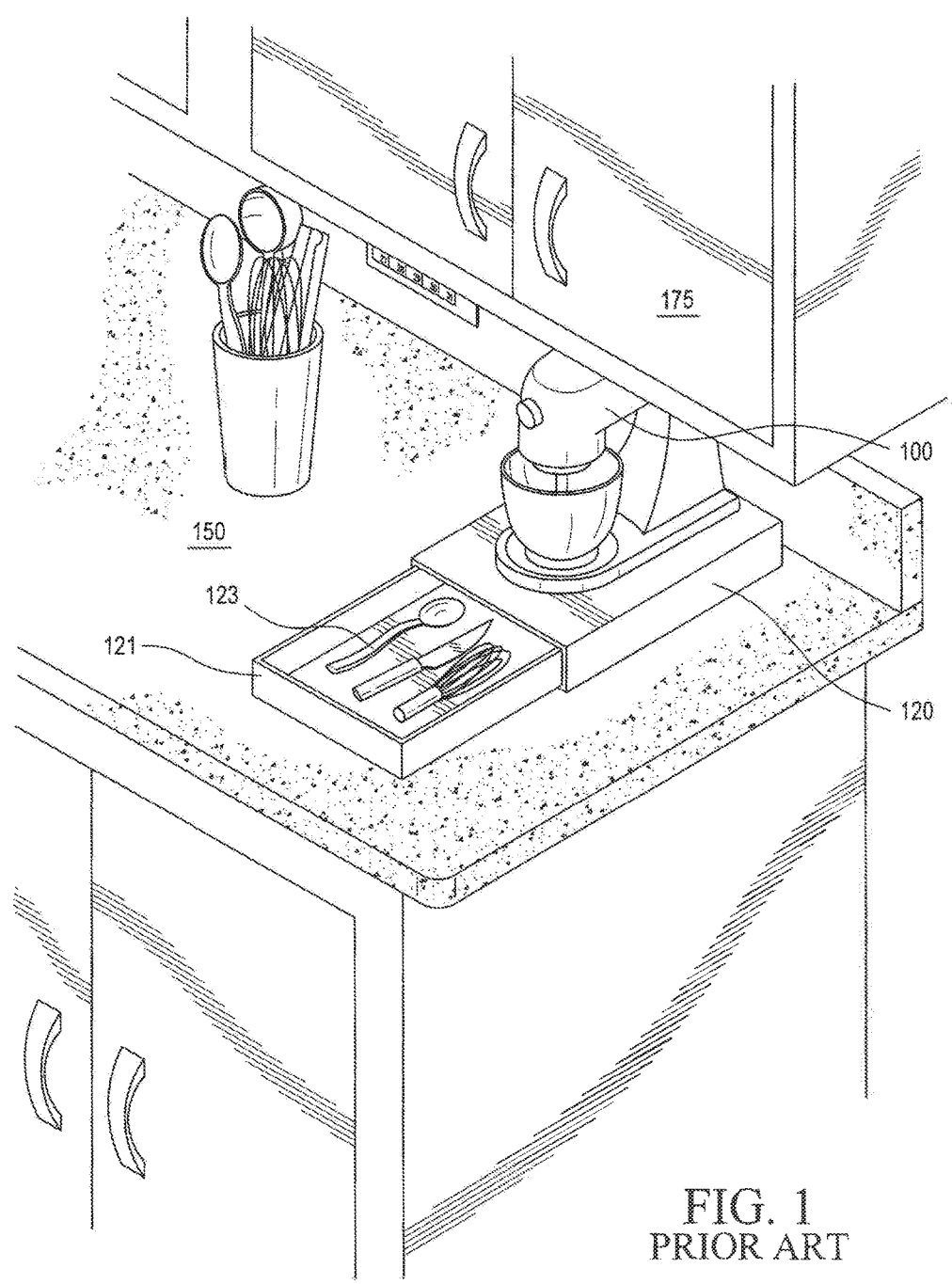
FIG. 1 shows an exemplary mixing machine and a drawer system in a user's kitchen.

Many users of mixing machines, food processors, or other types of devices use a countertop drawer to hold tools required for the device. FIG. 1 shows an exemplary mixing machine 100 in a user's kitchen. Mixing machine 100 sits on a single-drawer system 120 containing a single drawer 121, which sits on a countertop 150. Above countertop 150 and mixing machine 100 is a cabinet 175. In order to use the mixing machine 100, the user may select a tool (such as a spoon, whisk, or beater) stored in drawer 121, and install the tool into mixing machine 100. In many mixing machines, it is necessary to raise an upper portion of the mixing machine in order to install the tool.

It has been observed that in the kitchens of many homes, the space between the countertop (e.g., countertop 150) and the cabinet above (e.g., cabinet 175) provides sufficient space to store a mixing machine stacked on top of a single-drawer system, but is insufficient to allow easy operation of the mixing machine while arranged in a stacked configuration. For example, in an arrangement such as that shown in FIG. 1, when a user attempts to raise a portion of mixing machine 100 in order to install a desired tool, the user may find that the machine 100 is blocked by cabinet 175 and cannot be raised. As a result, in order to use the mixing machine 100, the user may be forced to remove the mixing machine 100 from its stacked position in order to install the desired tool, and then replace the mixing machine on top of the drawer system 120. Such an arrangement is clearly inconvenient.

In accordance with an embodiment, a rollable drawer system is provided. The rollable drawer system has a flat surface on which a mixing machine, food processor, or other device may be placed, and includes a drawer adapted to hold a variety of tools and other items. The rollable drawer system also has wheels that are selectively adjustable between a raised position and a lowered position. When the wheels are lowered, the rollable drawer system may be rolled on a countertop or other surface. When the wheels are raised, the rollable drawer system may not be rolled and remains securely in place on the countertop or other surface. Thus, for example, a user may stack a mixing machine on top of the rollable drawer system and store the two stacked appliances on a countertop (under a cabinet), with the wheels of the rollable drawer system in the raised position.

When the user wishes to use the mixing machine, the user may adjust the wheels to the lowered position, and roll the drawer system, and the mixing machine sitting on top thereof, out from under the cabinet. The user may then retract the wheels to the raised position in order to secure the drawer system in place on the countertop. The user may then raise a portion of the mixing machine, as necessary, to install a desired tool, and use the mixing machine. The user may then again lower the wheels and roll the drawer system and mixing machine back to their original location under the cabinet, and adjust the wheels to return them to the raised position. The drawer system and mixing machine are thus returned to their original location for storage until the next time the user wishes to use the mixing machine.

FIG. 2A shows a rollable drawer system in accordance with an embodiment. In particular, FIG. 2A is a perspective view showing the front, top, and one side of a rollable drawer system 200. Rollable drawer system 200 includes a housing 215 and a drawer 230. Drawer 230 includes an opening 232 that may facilitate opening and closing of the drawer 230, in a well-known manner. Two pads (of which one pad 280 is visible in FIG. 2A) are disposed on the underside of housing 215.

Housing 215 includes two sides and a top surface. Only one side of housing 215 is visible in FIG. 2A. The two sides and top of housing 215 define an opening at the front of housing 215. Drawer 230 may slide in and out of the opening at the front of housing 215. Housing 215 may comprise any suitable material such as a metal, a plastic material, etc.

In one embodiment, the two sides of housing 215 define an opening at the back of housing 215, and housing 215 does not include a back side. In one embodiment, drawer 230 may slide in and out through the opening at the back of housing 215. In another embodiment, drawer 230 cannot be withdrawn from the opening at the back of housing 215. In another embodiment, the housing includes a back side that encloses drawer 230.

The two sides of housing 215 include similar features. Each side of housing 215 includes a slot 265. Each side of housing 215 also includes an arm 250 which is fixed to the side of housing 215 at a pivot 247. Arm 250 has a first arm position and a second arm position. Arm 250 pivots on pivot 247 from the first arm position to the second arm position. More particularly, arm 250 has a first end 251 which engages with slot 265 and a second end 252 which may be manipulated by a user to adjust the arm's position. When the user adjusts second end 252, arm 250 pivots around pivot 247, causing first end 251 to move up and down within the respective slot 265.

Figure 2B:
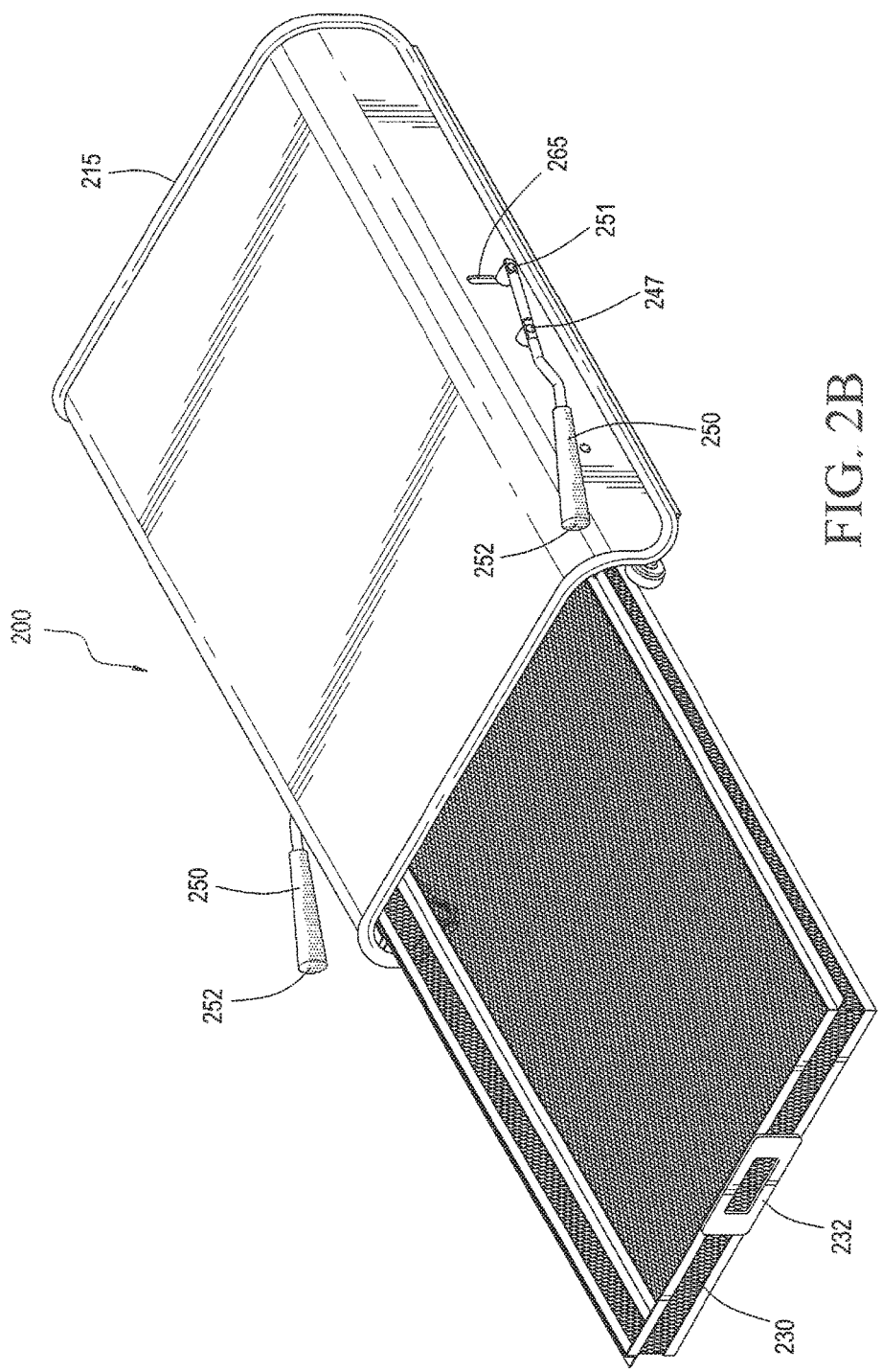

Drawer 230 has a first, closed position, shown in FIG. 2A, in which the drawer is fully inside the housing. Drawer 230 may slide out of housing 215 (e.g., a user may pull the drawer 230 out of housing 215) to a second, open position, in which the drawer is at least partially removed from housing 215. FIG. 2B shows rollable drawer system 200 with drawer 230 in the second, open position.

Figure 3:
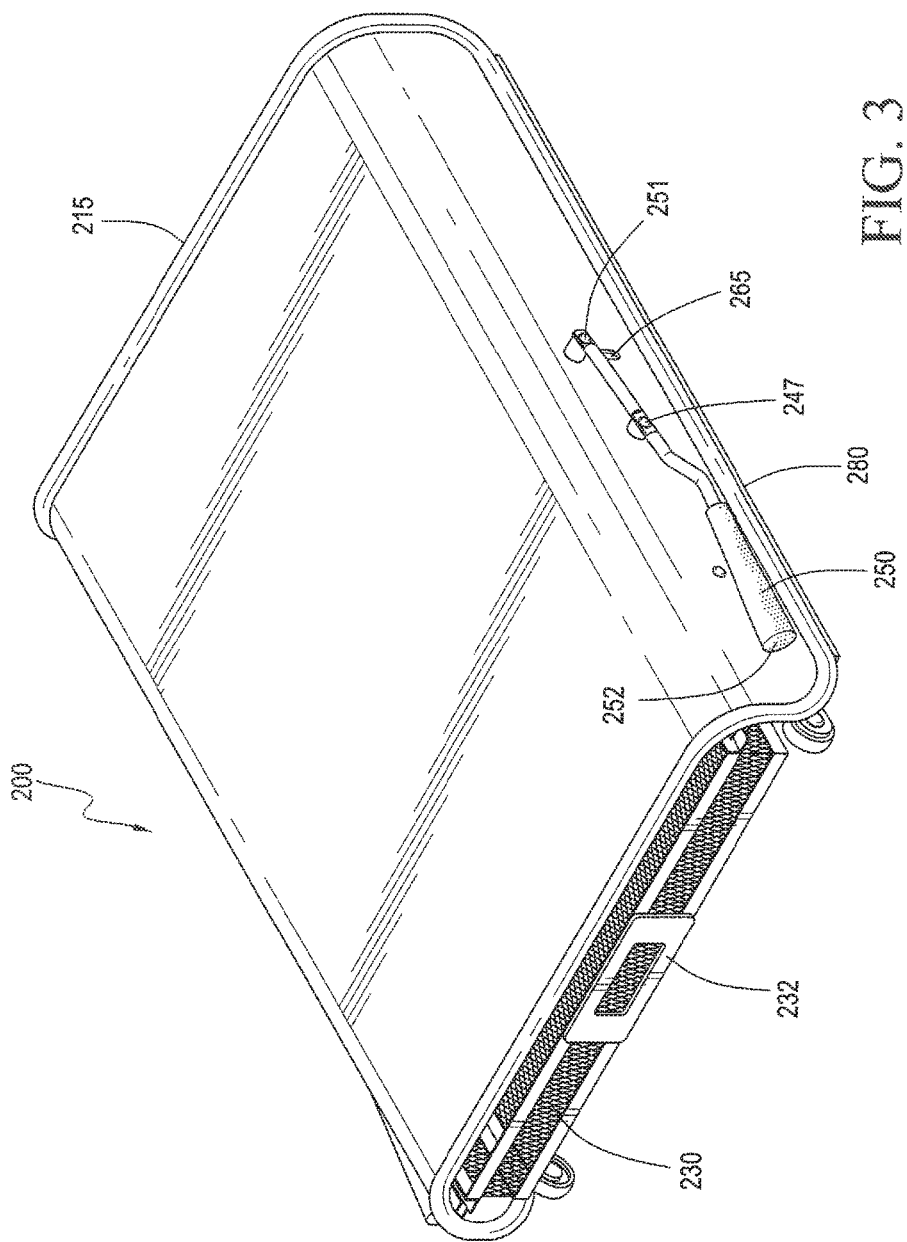

In FIGS. 2A-2B, arm 250 is shown in a first arm position. FIG. 3 shows rollable drawer system 200 when arm 250 is in a second arm position.

Figure 4A:
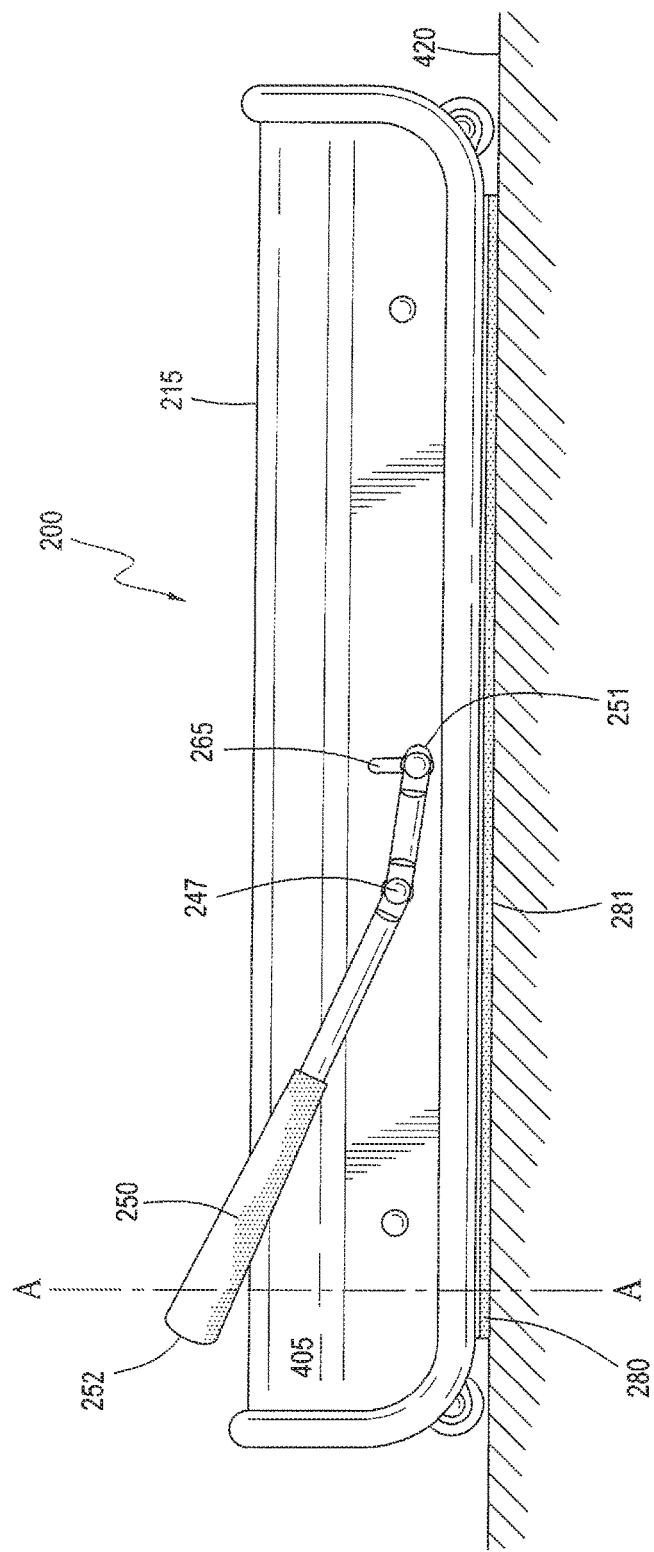
FIGS. 4A-4B show an exterior of a side of a rollable drawer system in accordance with an embodiment.

FIG. 4A shows a side view of rollable drawer system 200 when arm 250 is in the first arm position, which is an "up" position. Specifically, FIG. 4A shows an exterior of a side of rollable drawer system 200. The side of rollable drawer system 200 includes a wall 405 in which slot 265 is defined, and arm 280. An arm 250 pivots on pivot 247. When arm 280 is in the first arm position, as shown in FIG. 4A, rollable drawer system 200 may rest on a surface such as surface 420, which may be a countertop, for example. Specifically, a bottom surface of housing 215 is in contact with surface 420. In the illustrative embodiment, the bottom surface is a lower edge 281 of pad 280, which is in contact with, and rests, on surface 420. A second pad 280 on the opposite side of housing 215 may also rest on surface 420.

Figure 4B:
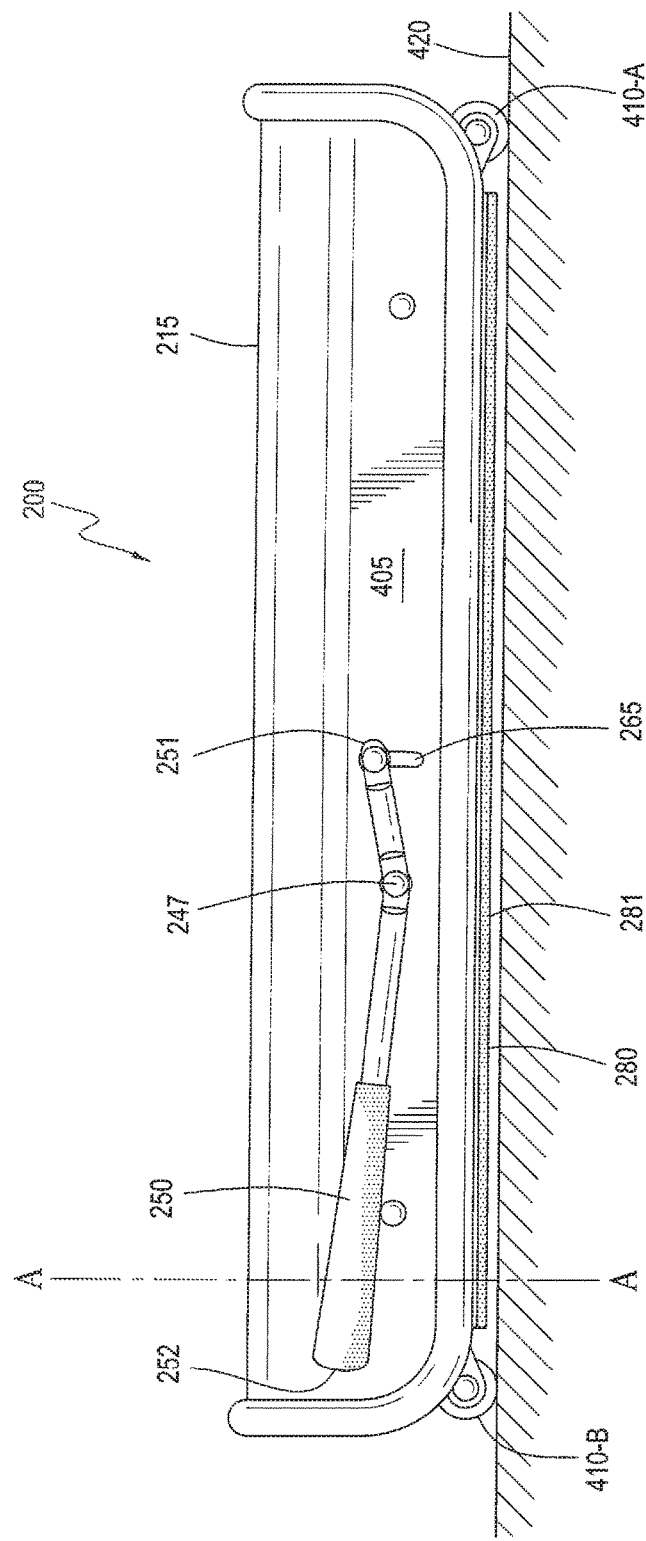

FIG. 4B shows a side view of rollable drawer system 200 when arm 250 is in the second arm position, which is the "down" position. When arm 250 is in the second arm position, as shown in FIG. 4B, rollable drawer system 200 is supported by two wheels 410-A, 410-B. Wheels 410-A, 410-B are in contact with surface 420; now pad 280 is not in contact with surface 420. A second arm on the opposite side of housing may be adjusted in a similar manner to cause a second pair of wheels 410 coupled to the opposite side of housing 215 to be lowered and to make contact with surface 420. When both pairs of wheels 410 are lowered, rollable drawer system 200 may roll on wheels 410.

Figure 5A:
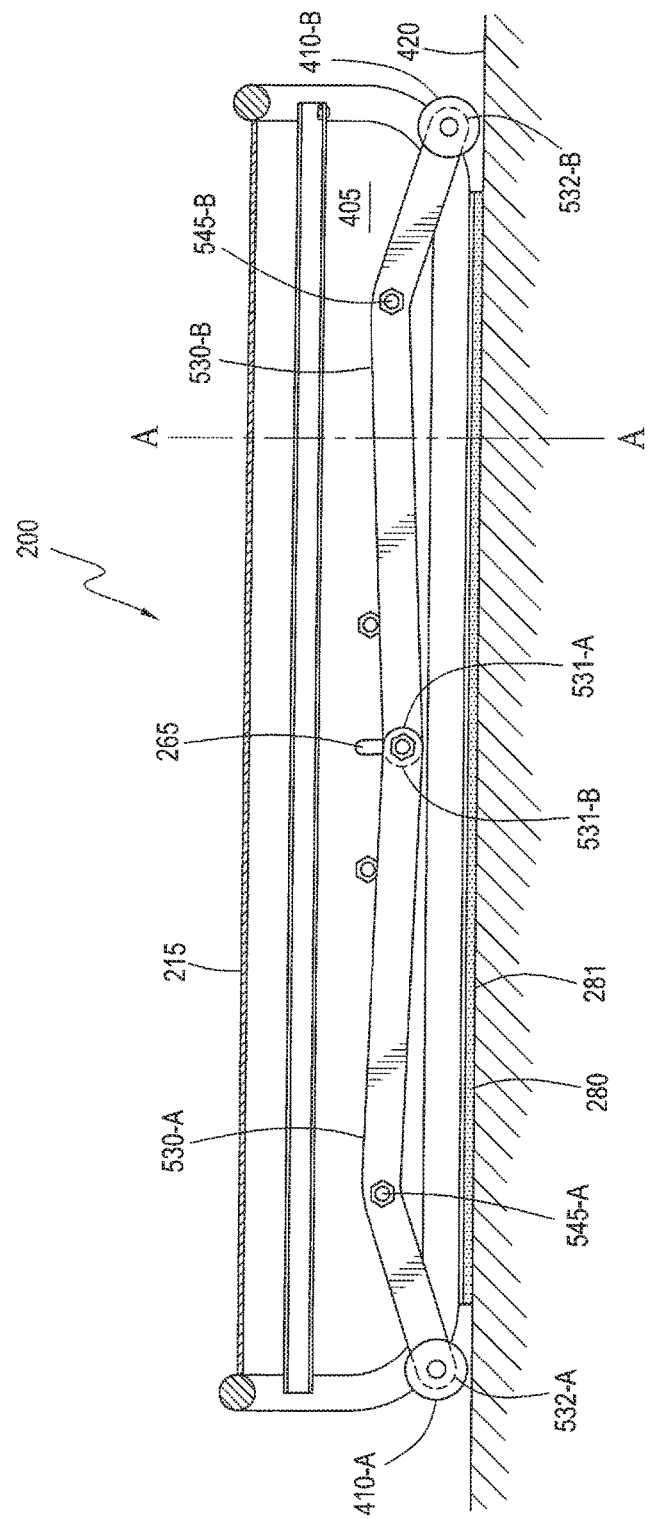
FIGS. 5A-5B show an interior of a side of a rollable drawer system in accordance with an embodiment.
Figure 5B:
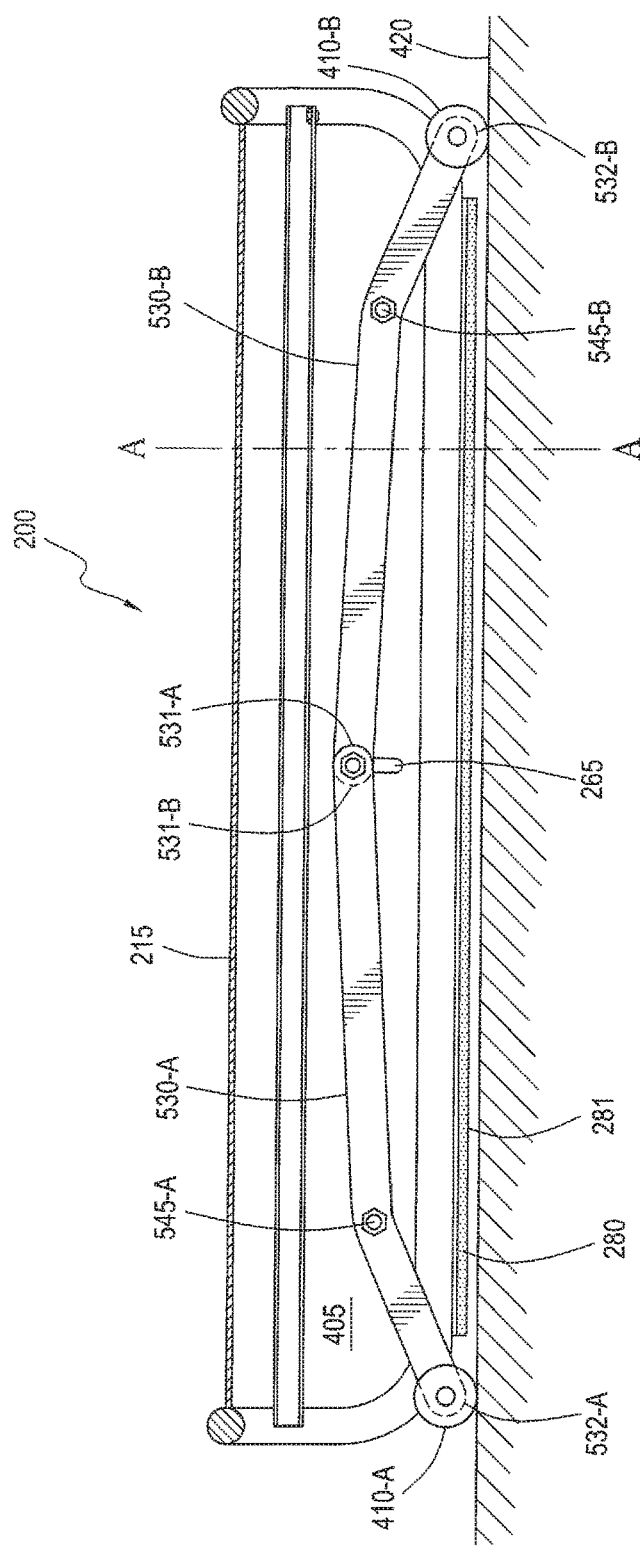

FIGS. 5A-5B show an interior of the side of rollable drawer system 200. The interior of the side includes wall 405, wheels 410-A and 410-B, and levers 530-A and 530-B. Wheels 410-A, 410-B are coupled to first and second levers 530-A, 530-B, respectively. Lever 530-A pivots on a first pivot 545-A and has a first end 531-A that is engaged with slot 265 and a second end 532-A that is coupled to wheel 410-A. Lever 530-B pivots on a second pivot 545-B and has a first end 531-B that is engaged with slot 265 and a second end 532-B that is coupled to wheel 410-B.

Levers 530-A and 530-B pivot on pivots 545-A and 545-B, respectively, from a first lever position to a second lever position. In FIG. 5A, levers 530-A and 530-B are in the first lever position, in which first end 531-A and first end 531-B are positioned in a "down" position at the bottom of slot 265. When first ends 531-A, 531-B are in the "down" position, as in FIG. 5A, second end 532-A of lever 530-A and second end 532-B of lever 530-B are raised; consequently, wheels 410-A and 410-B are in a first wheel position, or "raised" position, in which the wheels are above the lower edge 281 of pad 280. In this first wheel position, no portion of wheels 410 is below edge 281, which constitutes the bottom surface of housing 215; thus wheels 410-A and 410-B do not contact surface 420.

In FIG. 5B, levers 530-A and 530-B are in the second lever position, in which first end 531-A and first end 531-B are positioned in an "up" position, at the top of slot 265. When first ends 531-A and 531-B are in the "up" position, as in FIG. 5B, second end 532-A of lever 530-A and second end 532-B of lever 530-B are lowered; consequently, wheels 410-A and 410-B are in a second wheel position, or a "lowered" position, in which at least a portion of the wheels are lower than the lower edge 281 of pad 280. Because at least a portion of wheels 410 are below edge 281, which is the bottom surface of housing 215, wheels 410-A and 410-B are in contact with surface 420.

In the illustrative embodiment, the mechanism shown in FIGS. 5A-5B is present, and functions in the manner described herein, on both sides of rollable drawer system 200. When wheels 410-A and 410-B of both sides of housing 215 are in the lowered position on both sides of housing 215, rollable drawer system 200 may roll on surface 420.

FIG. 6A shows a cross-section of rollable drawer system 200 taken at line A (shown in FIGS. 4A-4B). In the illustrative embodiment, a lower edge of each side of housing 215 is coupled to a respective flange 695. Each flange 695 extends horizontally along the underside of housing 215. Each flange 695 may be between one-fourth inch and one inch wide, for example. Other dimensions may be used.

Each flange 695 may be connected to the side of housing 215 by any suitable connecting mechanism such as glue, screws, fasteners, etc. In another embodiment, the lower edge of each side of housing 215 curves inward and extends inwardly to form a flange such that the side and the flange form a single integrated piece.

A respective pad 280 is attached to each respective flange 695. Pad 280 may comprise any suitable material such as a plastic material, a foam material, a cloth material, etc. Pad 280 may be glued to flange 695, for example. In other embodiments, pad 280 may be attached to flange 695 by another type of connecting mechanism, such as by screws, nails, or other fasteners. In another embodiment, each side of housing 215 may include multiple pads.

In the illustrative embodiment of FIG. 6A, drawer 230 is supported by, and slides on, a pair of tracks 625. In other embodiments, a drawer system may be constructed differently, and the drawer may use a different mechanism to move or slide.

In other embodiments, a different type of pad system may be used. For example, FIG. 6B shows a rollable drawer system in accordance with another embodiment. Rollable drawer system 700 includes a housing 715 and drawer 230. Housing 715 includes two side walls 705. Each side wall 705 does not include a flange. A U-shaped pad 680 is attached to the lower end of each side wall 705.

Figure 7:
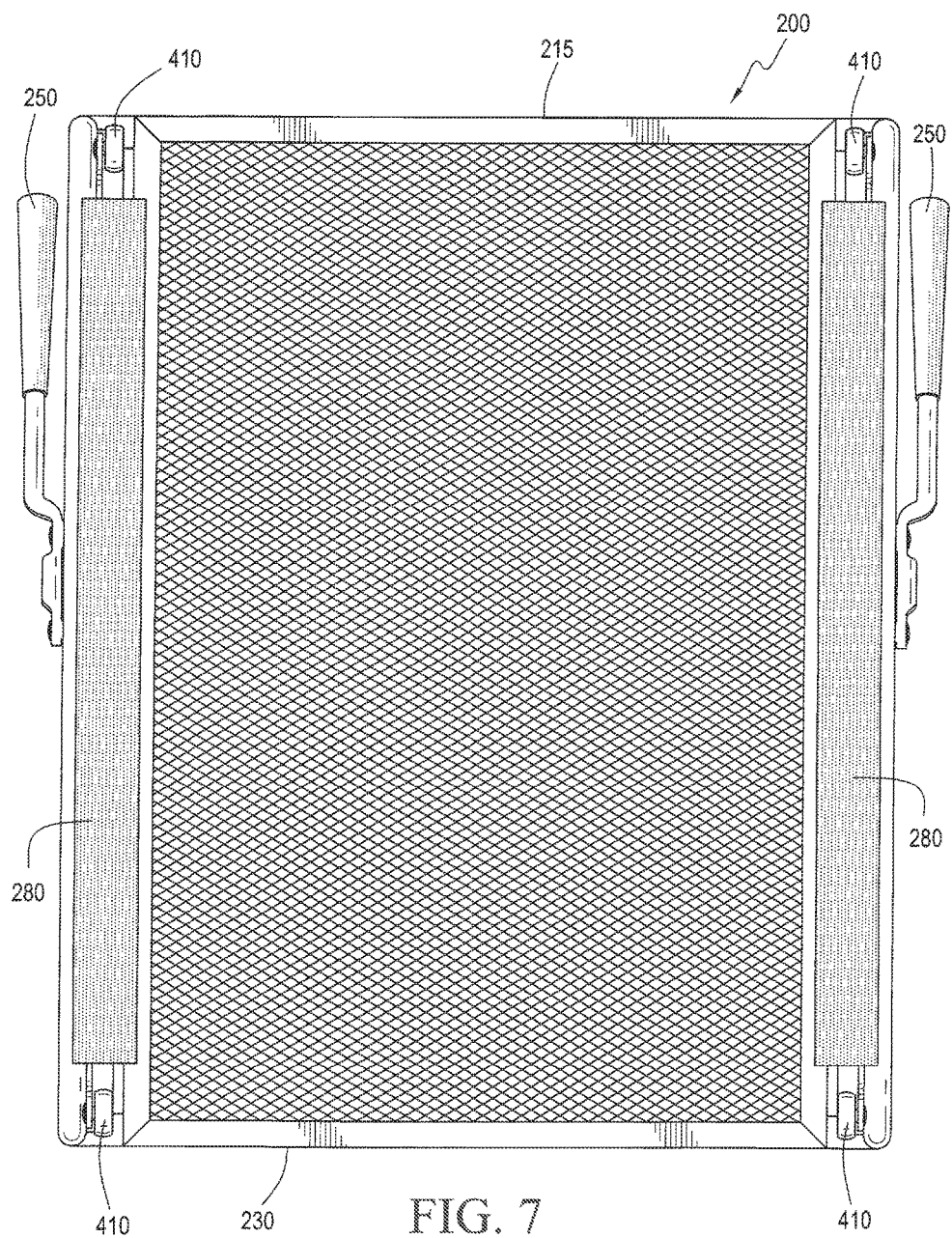
FIG. 7 shows a bottom view of a rollable drawer system in accordance with an embodiment.

FIG. 7 shows a bottom view of rollable drawer system 200. Drawer 230 is visible from the underside of rollable drawer system 200. On each side of housing 215, a pad 280, a pair of wheels 410, and an arm 250 are visible.

FIG. 8 shows a cross-section of a portion of the side wall 405 of rollable drawer system 200 in accordance with an embodiment. Slot 265 is defined within wall 405. A friction-generating element 825 fits in and is engaged in slot 265. Friction-generating element 825 may comprise plastic, for example, or another material. Arm 250, and levers 530-A and 530-B, are coupled to friction-generating element 825 by a fastening element 850, which may be a screw, a bolt, or another type of fastener, for example.

Friction-generating element 825 is adapted to slide up and down within slot 265. However, the friction generated between friction-generating element 825 and side wall 405 (at the edges of slot 265) is sufficient to maintain friction-generating element 825 in a selected position within slot 265. For example, when a user raises arm 250 to the "up" position within slot 265, friction-generating element 825 and levers 530 also move to the "up" position. Friction causes friction-generating element 825, arm 250, and levers 530 to remain in the "up" position.

In other embodiments, other mechanisms may be used to couple arm 250 to levers 530 via slot 265.

Figure 9A:
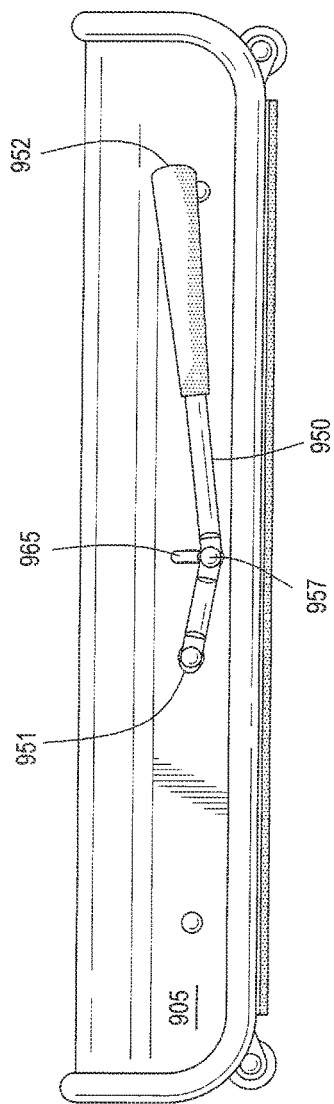
FIGS. 9A-9B show side views of a rollable drawer system in accordance with another embodiment.
Figure 9B:
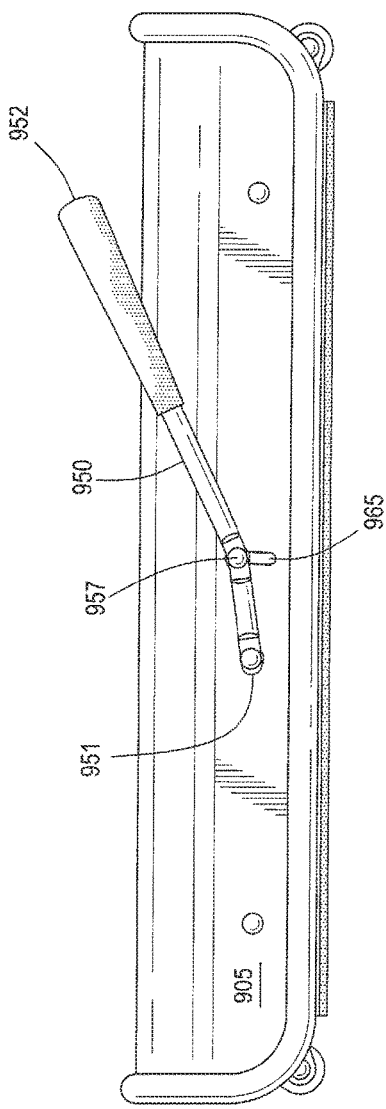

FIGS. 9A-9B show a side view of a rollable drawer system in accordance with another embodiment. In this embodiment, an arm 950 has a first end 951 fixed to a sidewall 905 and a second end 952 which may be adjusted by a user. Arm 950 also includes an element 957 (which may be a screw or bolt, for example) which is positioned in a middle portion of the arm and is engaged in a slot 965. Element 957 is adapted to move up and down within slot 965. Arm 950 has a "down" position, as shown in FIG. 9A, and an "up" position, as shown in FIG. 9B. Arm 950 may control the movements of wheels arranged on the interior side of wall 905, in a manner similar to that described above.

Figure 10A:
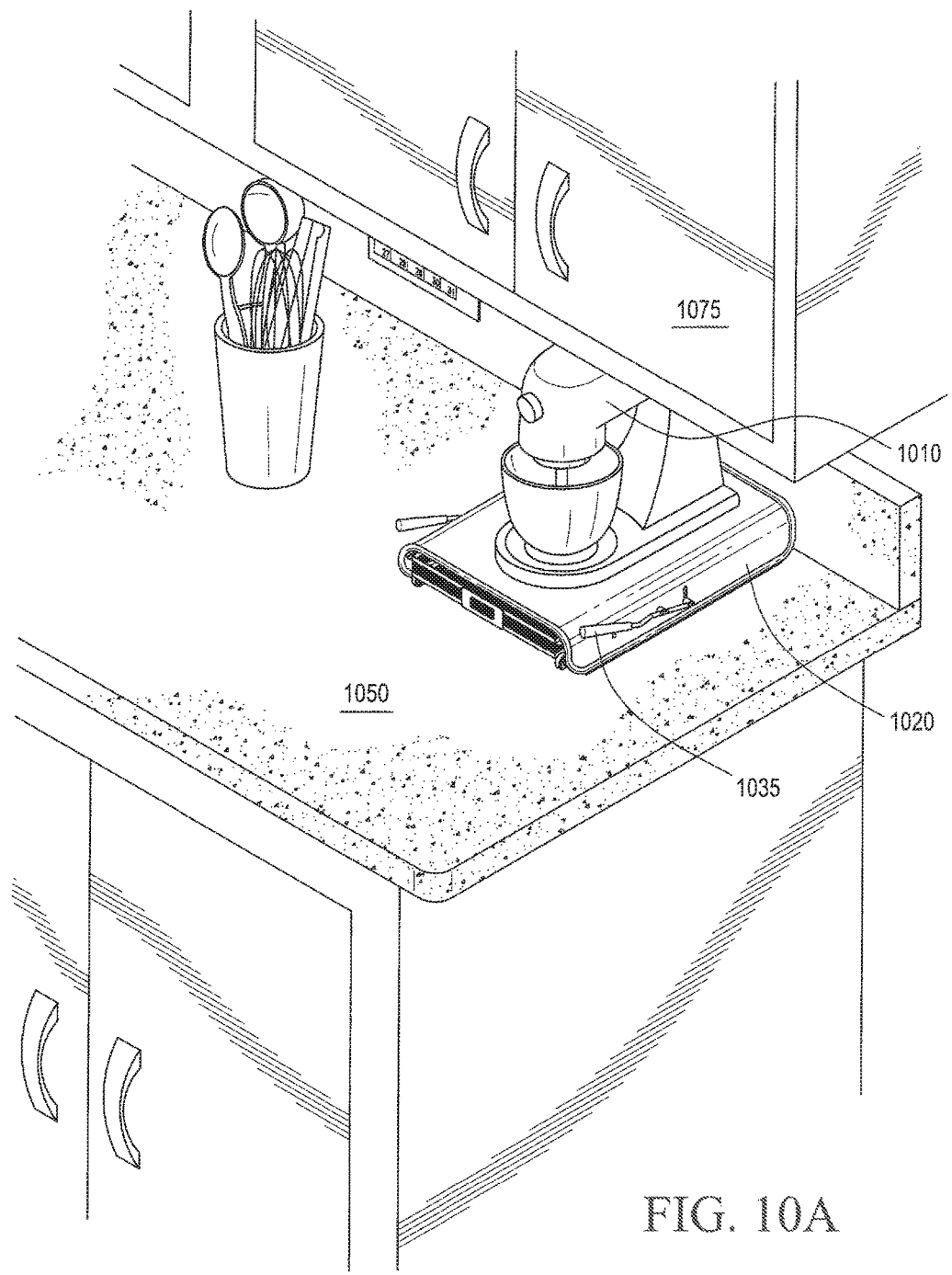
FIGS. 10A-10D show a mixing machine stacked on top of a rollable drawer system, on a countertop in a kitchen, in accordance with an embodiment.
Figure 10B:
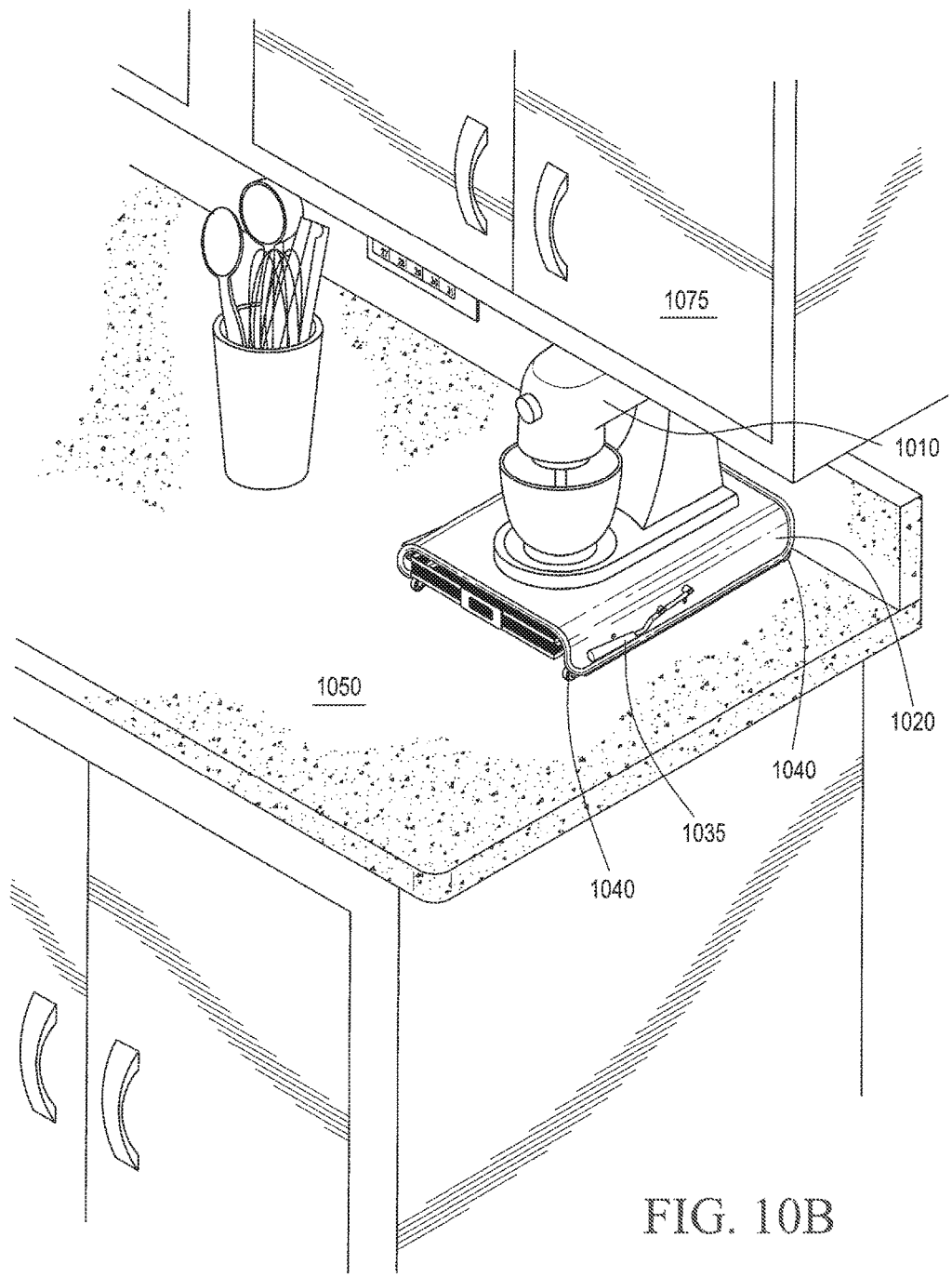
Figure 10C:
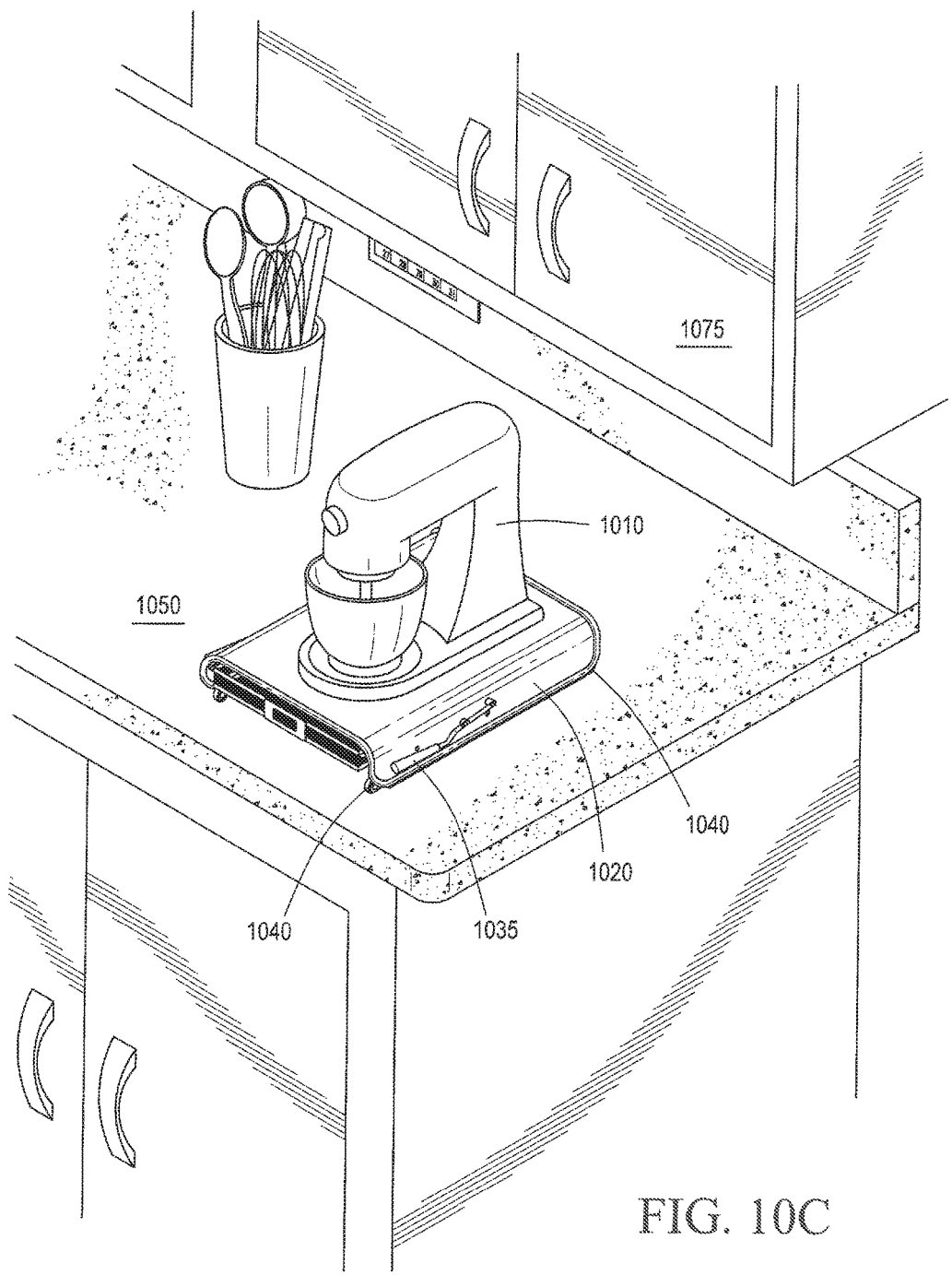
Figure 10D:
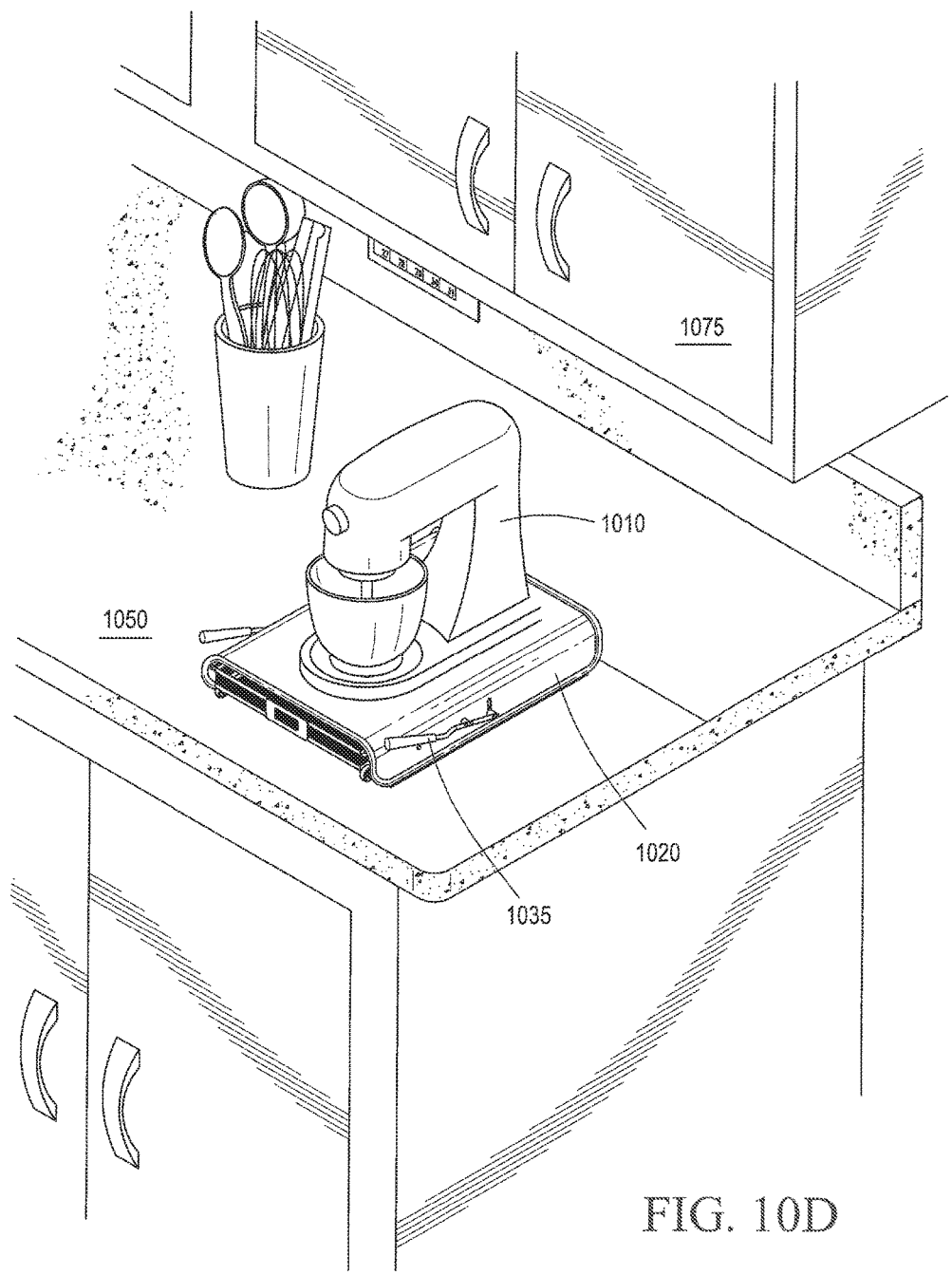

Systems, apparatus, and methods described herein advantageously have numerous uses. For example, a user may store any desired object(s) in drawer 230 and roll the drawer system 200 on a surface to a desired location for storage. In a preferred use, rollable drawer system 200 may advantageously facilitate the use of a mixing machine or food processor in a user's kitchen. Referring to FIG. 10A, a user may stack a mixing machine 1010 on top of a rollable drawer system 1020, and store the stacked appliances on a countertop 1050, under a cabinet 1075. When the user wishes to use the mixing machine 1010, the user may adjust an arm 1035 of the rollable drawer system 1020 from a first arm position to a second arm position in order to lower the drawer system's wheels 1040, as shown in FIG. 10B. The user may then roll the drawer system 1020, with the mixing machine 1010 sitting on top thereof, out from under the cabinet 1075, as shown in FIG. 10C. With the rollable drawer system 1020 and the mixing machine 1010 out from under the cabinet 1075, the user may then adjust the arm 1035 to the first arm position in order to retract (raise) the wheels, causing the rollable drawer system 1020 to rest securely on the countertop 1050, as shown in FIG. 10D. The user may now easily raise an upper portion of the mixing machine 1010 without obstruction, install a desired tool, and use the mixing machine 1010.

It is known that mixing machines are heavy and unwieldy and therefore can be difficult to move around manually in a kitchen. It is also known that mixing machines generate a significant amount of energy and vibration when in use. Advantageously, a rollable drawer system such as rollable drawer system 1020 allows a user to roll the drawer system and the mixing machine 1010 across the countertop as desired. Also, drawer system 1020 advantageously allows the user to retract the drawer system's wheels to secure the drawer system 1020 on the countertop surface while the mixing machine 1010 is being used, thereby preventing the drawer system 1020 from slipping or moving on the countertop due to the vibrations caused by the mixing machine 1010.

After using the mixing machine 1010, the user may again lower the wheels 1040, roll the drawer system 1020 and mixing machine 1010 back to their original location under the cabinet 1075, and retract the wheels 1040 to the raised position. The drawer system 1020 and mixing machine 1010 may in this manner be returned to their original location for storage until the next time the user wishes to use the mixing machine 1010.

Figure 11:
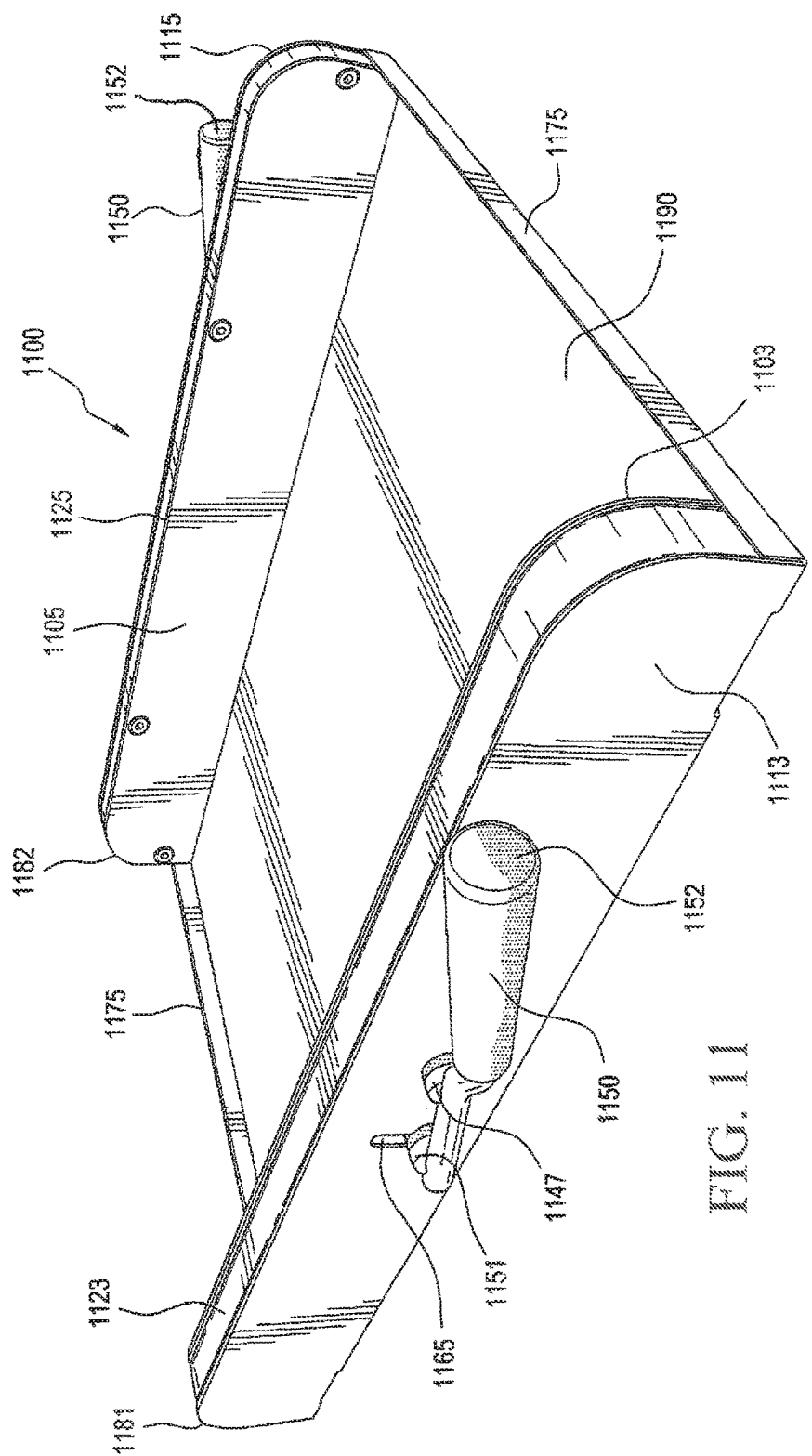
FIG. 11 is a perspective view showing the front, top, and one side of a rollable support system in accordance with an embodiment.
Figure 12:
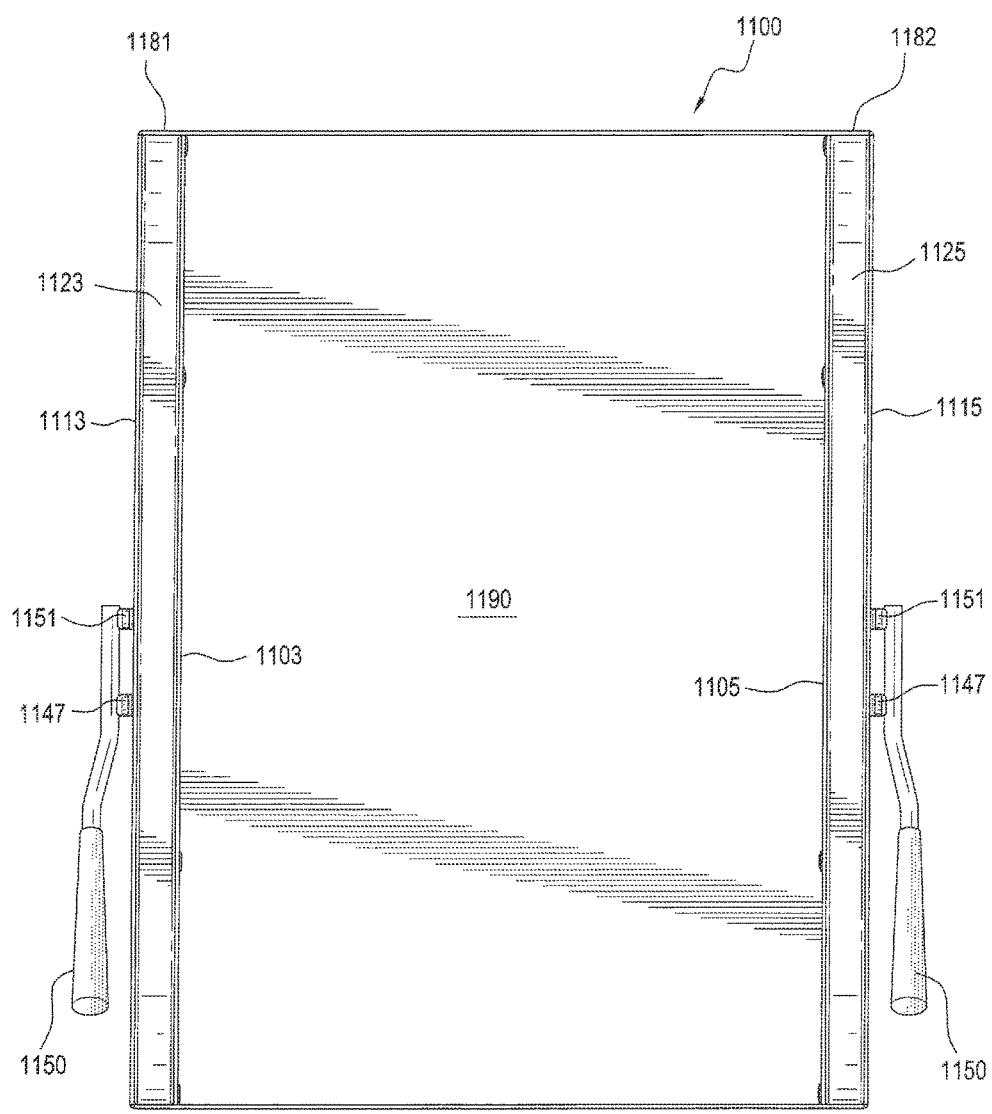
FIG. 12 shows a top view of a rollable support system in accordance with an embodiment.
Figure 13:
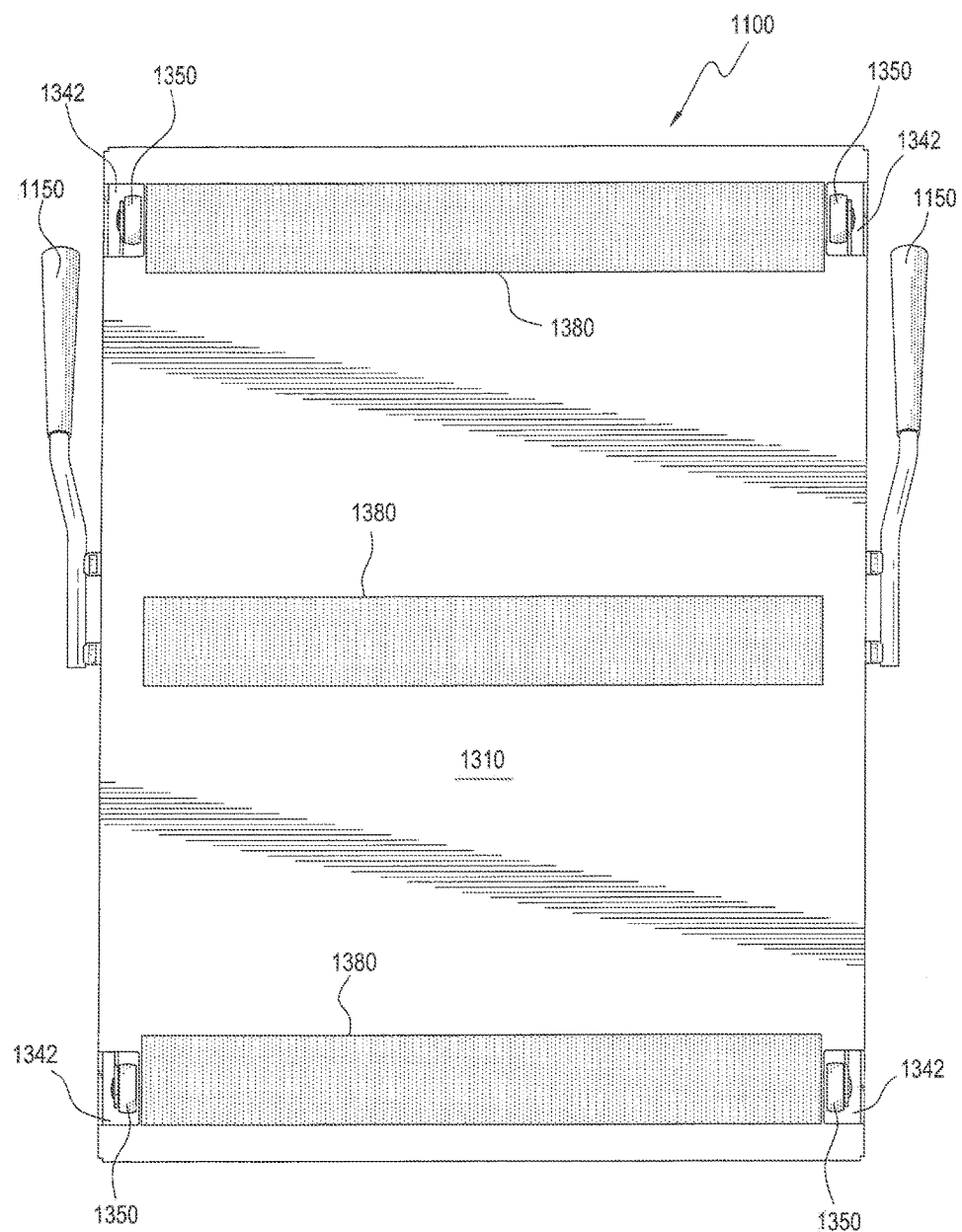
FIG. 13 shows a bottom view of a rollable support system in accordance with an embodiment.
Figure 14:
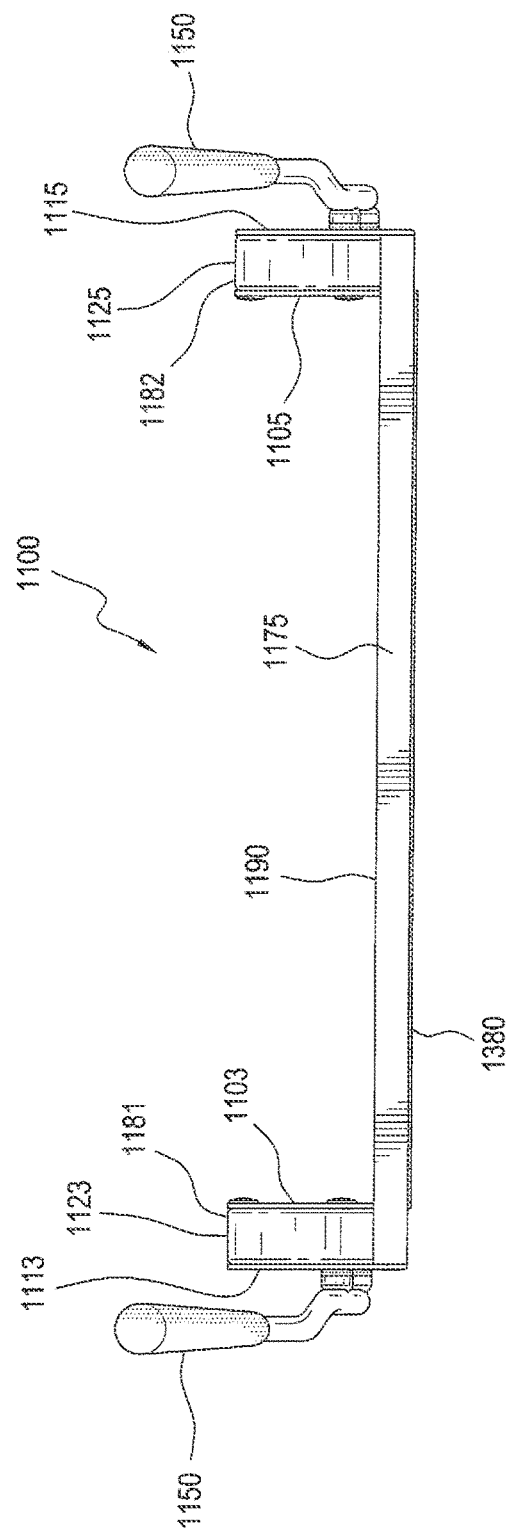
FIG. 14 shows an end view of a rollable support system in accordance with an embodiment.

In accordance with another embodiment, a rollable appliance support system functions in a manner similar to the drawer system 200 described above; however, the rollable appliance support system does not include a drawer. FIGS. 11-14 show a rollable support system 1100 in accordance with an embodiment. FIG. 11 is a perspective view showing the front, top, and one side of rollable support system 1100. FIG. 12 shows a top view of rollable support system 1100. FIG. 13 shows a bottom view of rollable support system 1100. FIG. 14 shows an end view of rollable support system 1100.

Rollable support system 1100 includes a bottom portion 1190 and two side portions 1181, 1182. Side portion 1181 includes an inner wall 1103, an outer wall 1113, and a cover portion 1123. Inner wall 1103 is joined to bottom portion 1190. Cover portion 1123 is joined to inner wall 1103 and to outer wall 1113. Side portion 1182 includes an inner wall 1105, an outer wall 1115, and a cover portion 1125. Inner wall 1105 and outer wall 1115 are joined by a cover portion 1125.

Rollable support system 1100 does not include a drawer.

Rollable support system 1100 also includes a first lip 1175 disposed along an edge at the front end and a second lip 1175 disposed along an edge at the back end of bottom portion 1190.

FIG. 13 shows the underside of rollable support system 1100 in accordance with an embodiment. A plurality of pads 1380 are disposed on the underside of rollable support system 1100. In other embodiments, fewer than three pads, or more than three pads, may be used. For example, in one embodiment, a single pad is disposed on the underside of rollable support system 1100. Pads 1380 may comprise any suitable material such as a plastic material, a foam material, a cloth material, etc. The underside of rollable support system 1100 also includes two pairs of openings 1342.

Each side portion of rollable support system holds a pair of wheels 1350. Each wheel 1350 is disposed proximate a respective opening 1342 that allows the wheel to be extended from the respective side portion and retracted into the side portion.

Referring again to FIG. 11, each side portion of rollable support system 1100 includes an arm 1150 which is fixed to the respective outer wall 1113 or 1115 at a pivot 1147. Arm 1150 functions in a manner similar to arm 250 described above. Thus, arm 1150 has a first arm position and a second arm position. Arm 1150 pivots on pivot 1147 from the first arm position to the second arm position. More particularly, arm 1150 has a first end 1151 which engages with slot 1165 and a second end 1152 which may be manipulated by a user to adjust the arm's position. When the user adjusts second end 1152, arm 1150 pivots around pivot 1147, causing first end 1151 to move up and down within the respective slot 1165.

Each arm 1150 is coupled to a respective pair of levers similar to levers 530-A, 530-B of FIGS. 5A-5B. Similarly, the levers coupled to arm 1150 are attached to a respective pair of wheels 1350 (shown in FIG. 13).

Specifically, a first lever mechanism of rollable support system 1100 is disposed in a first volume defined by inner wall 1103, outer wall 1113, and cover 1123. This first lever mechanism functions in a manner similar to levers 530-A, 530-B of FIGS. 5A-5B. A second lever mechanism of rollable support system 1100 is disposed in a second volume between inner wall 1105, outer wall 1115, and cover 1125. This second lever mechanism functions in a manner similar to levers 530-A, 530-B of FIGS. 5A-5B.

Accordingly, in a manner similar to that described above with reference to FIGS. 5A-5B, movement of each arm 1150 causes a corresponding pair of wheels 1350 to move between a first, raised, position and a second, lowered, position.

Figure 15:
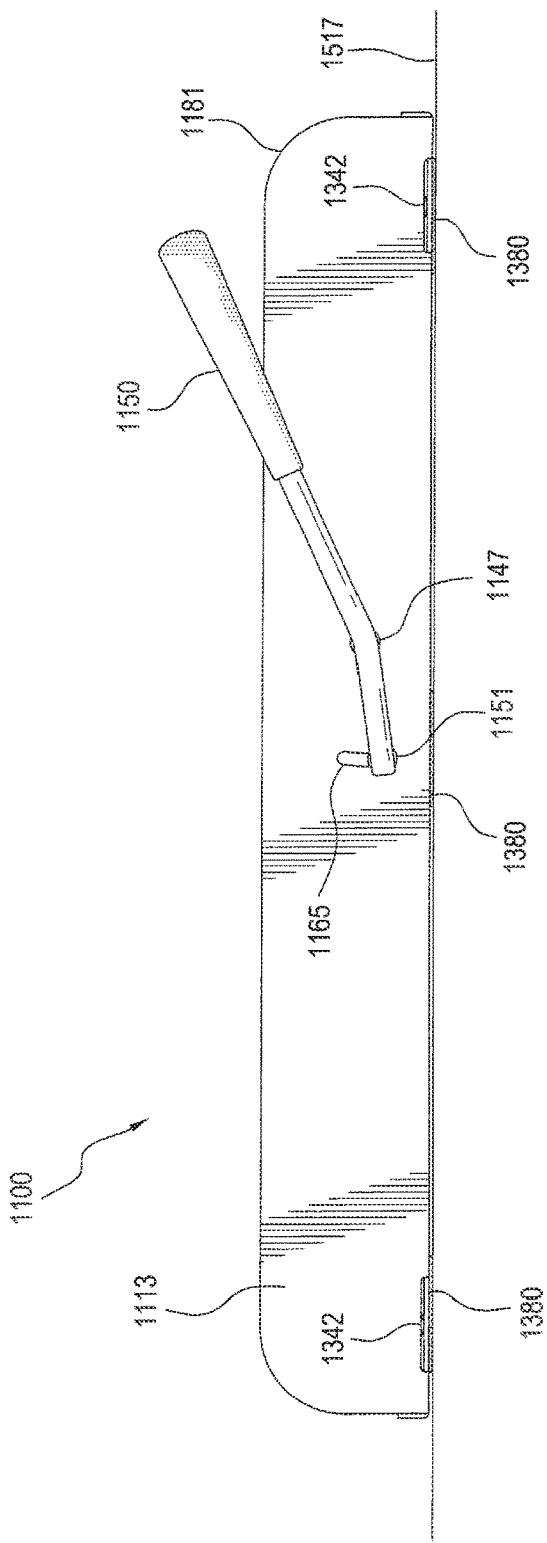
FIG. 15 shows a side view of a rollable support system resting on a surface in accordance with an embodiment.

FIG. 15 shows a side view of rollable support system 1100 resting on a surface 1517. For example, surface 1517 may be a countertop, a table, etc. In FIG. 15, each arm 1150 is in a raised position. Accordingly, each wheel 1350 (not shown) is also in a raised position. Pads 1380 are in contact with surface 1517. Consequently, rollable support system 1100 rests securely on surface 1517.

Figure 16:
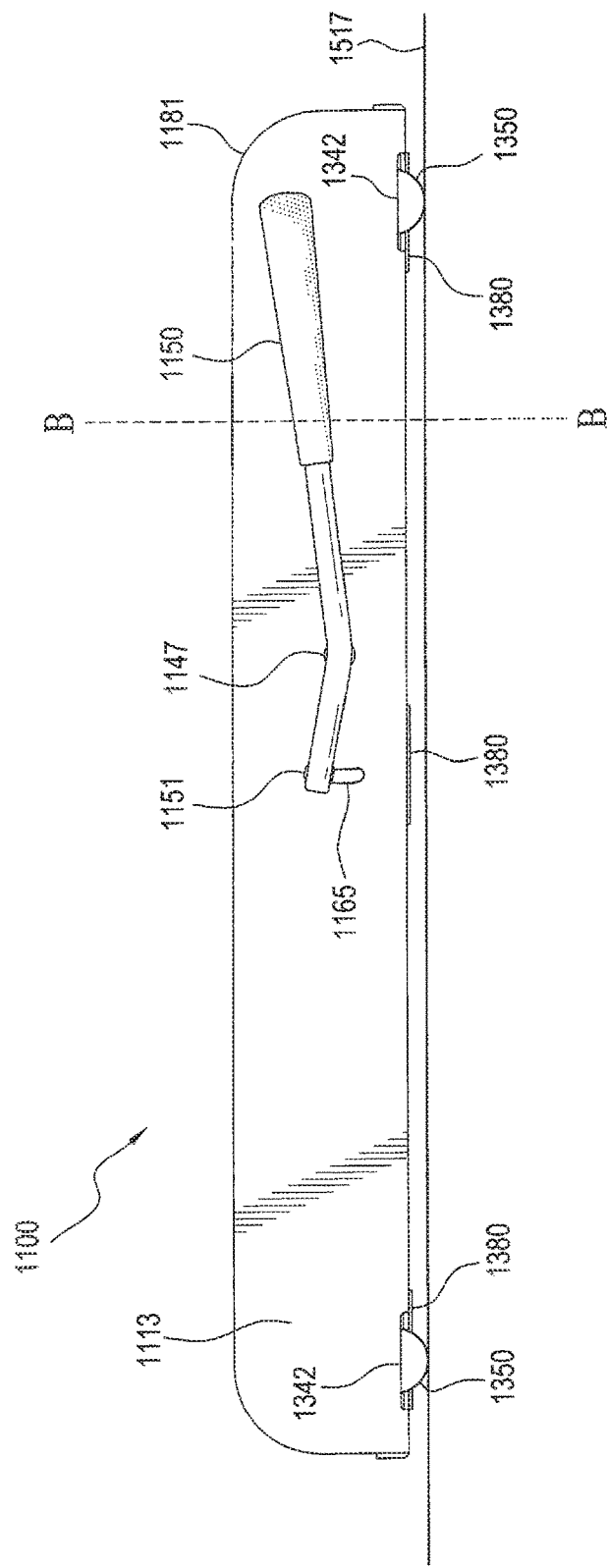
FIG. 16 show a side view of a rollable support system resting on a surface in accordance with an embodiment.

A user may manipulate wheels 1350 by moving arms 1150. FIG. 16 shows a side view of rollable support system 1100 disposed on surface 1517. In FIG. 16, each arm 1150 is in a lowered position. Accordingly, each wheel 1350 is also in a lowered position. Consequently, pads 1380 are raised above (and are not in contact with) surface 1517. Wheels 1350 are in contact with surface 1517. Consequently, rollable support system 1100 may now roll on surface 1517.

FIG. 17 shows a cross-section of a side portion of rollable support system 1100 determined at line B (shown in FIG. 16) in accordance with an embodiment. A volume 1730 is defined within side portion 1181 by inner wall 1103, outer wall 1113, cover portion 1123, and horizontal portion 1190. A lever mechanism 1730 is disposed within volume 1730 of side portion 1181, and functions in a manner similar to levers 530-A, 530-B of FIGS. 5A-5B. Arm 1150 is coupled to and controls lever mechanism 1730 as described above.

In accordance with an embodiment, an object, such as a household appliance, may be stored on bottom portion 1190 of rollable support system 1100, and may be subsequently moved easily from one position to a second position by rolling rollable support system 1100.

Figure 18A:
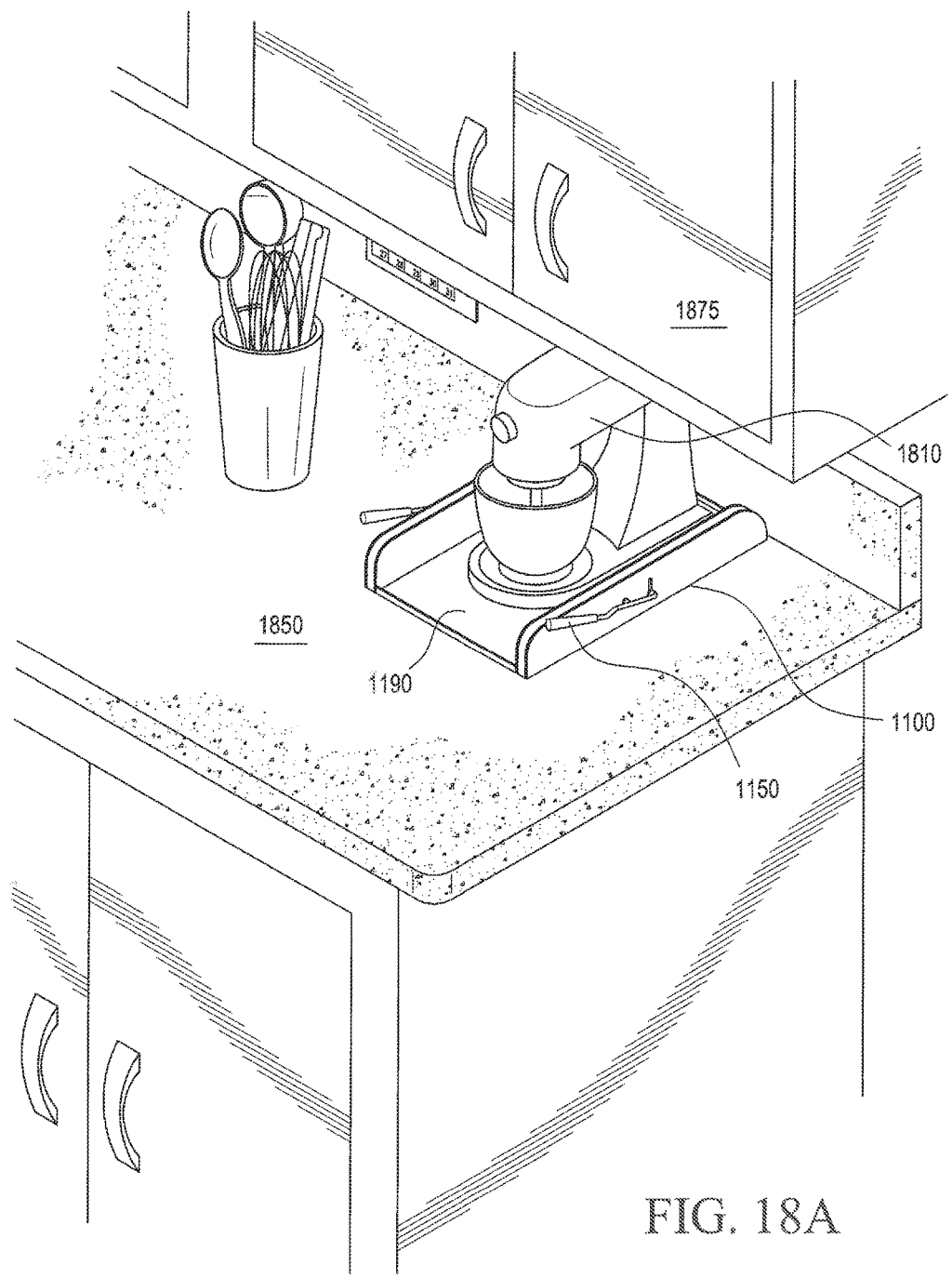
FIGS. 18A-18D show a mixing machine stacked on top of a rollable support system, on a countertop in a kitchen, in accordance with an embodiment.
Figure 18B:
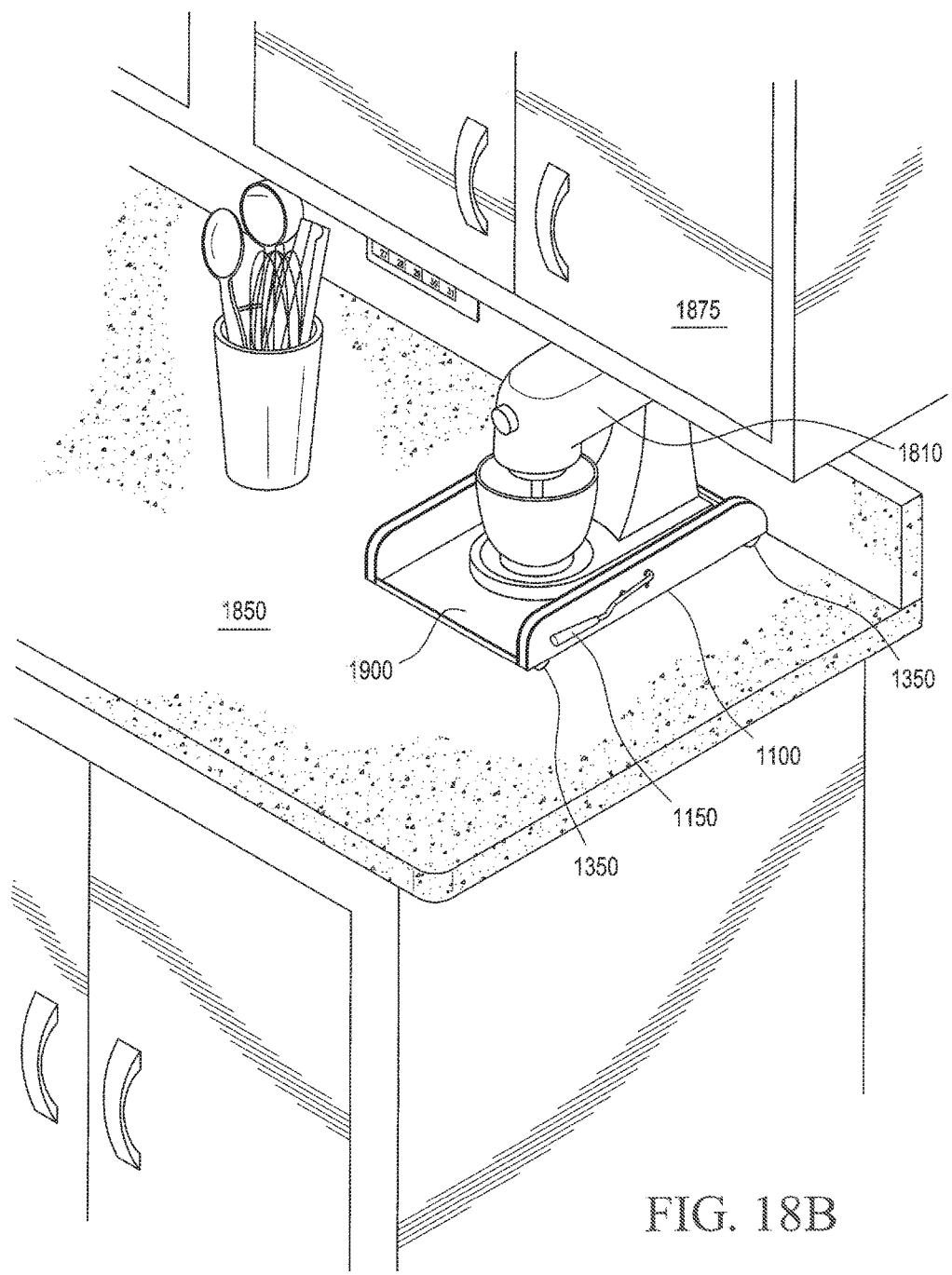
Figure 18C:
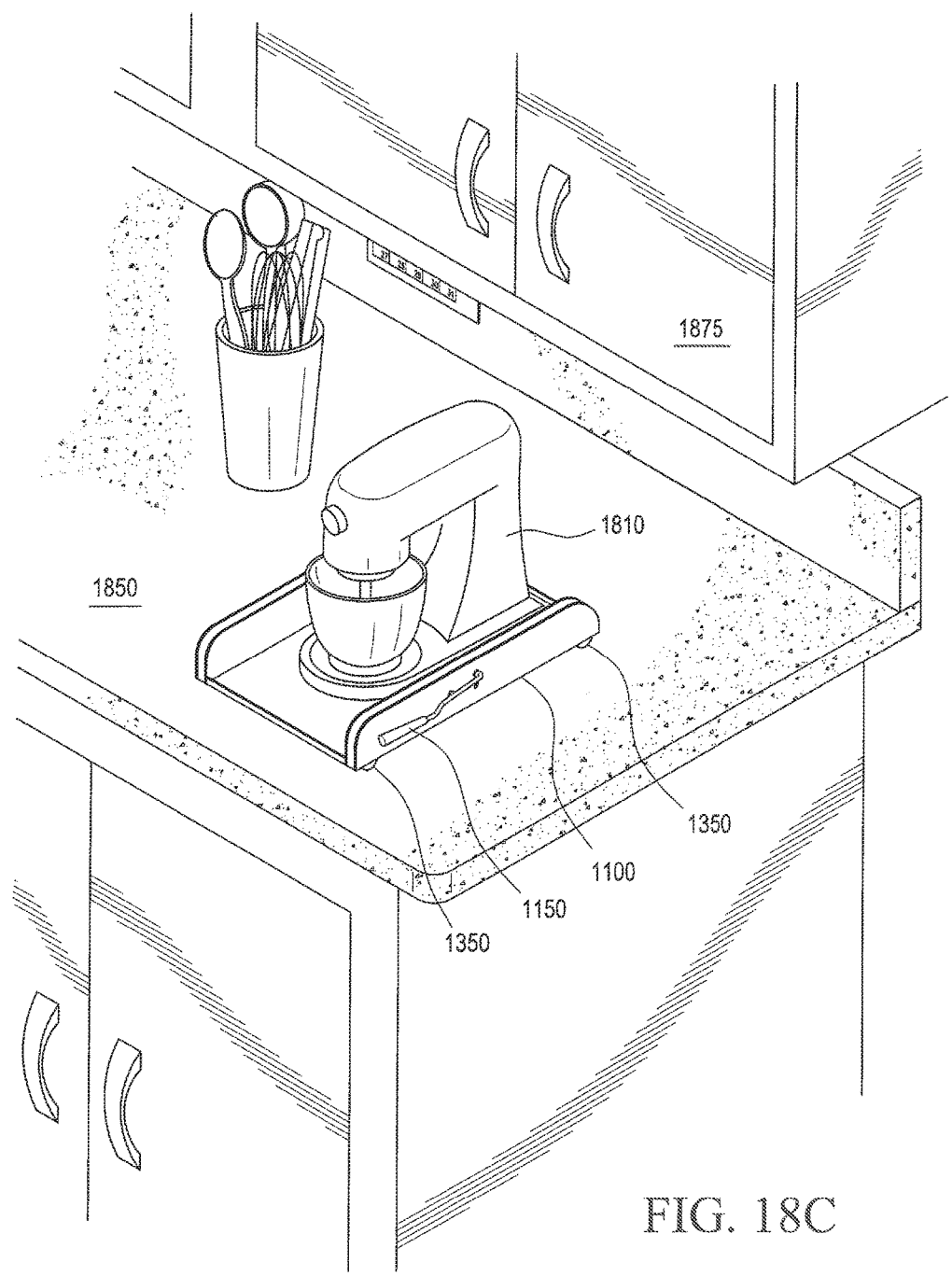
Figure 18D:
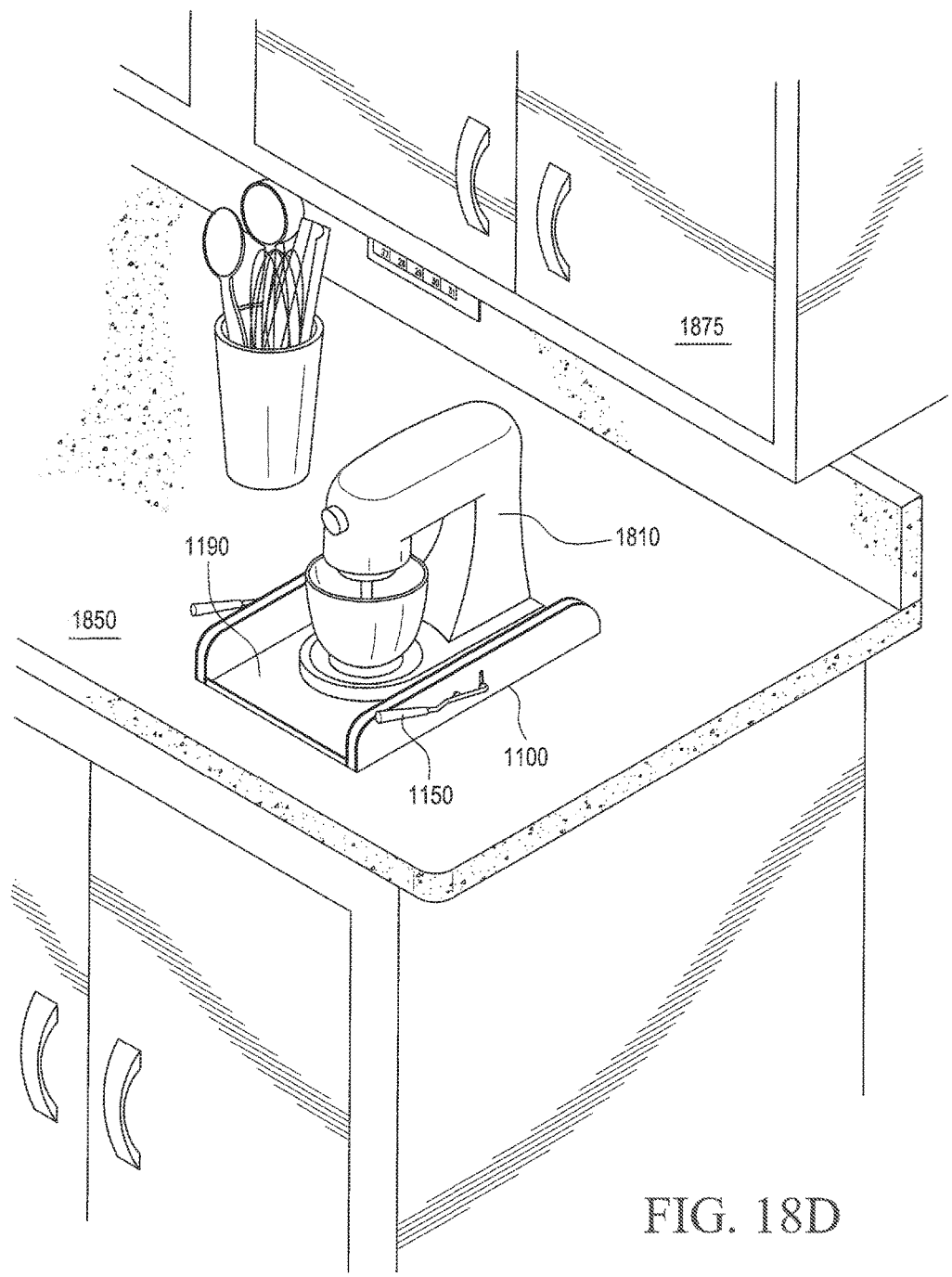

For example, a user may store any desired object(s) on bottom portion 1190 of rollable support system 1100, and roll the rollable support system 1100 on a surface to a desired location for storage. In a preferred use, rollable support system 1100 may advantageously facilitate the use of a mixing machine or food processor in a user's kitchen. Referring to FIG. 18A, a user may stack a mixing machine 1810 on bottom portion 1190 of a rollable support system 1100, and store the stacked appliances on a countertop 1850, under a cabinet 1875. When the user wishes to use the mixing machine 1810, the user may adjust an arm 1150 of the rollable support system 1100 from a first arm position to a second arm position in order to lower the rollable support system's wheels 1350, as shown in FIG. 18B. The user may then roll the support system 1100, with the mixing machine 1810 resting thereon, out from under the cabinet 1875, as shown in FIG. 18C. With the rollable support system 1100 and the mixing machine 1810 out from under the cabinet 1875, the user may then adjust the arm 1150 to the first arm position in order to retract (raise) the wheels 1350, causing the rollable support system 1100 to rest securely on the countertop 1850, as shown in FIG. 18D. The user may now easily raise an upper portion of the mixing machine 1810 without obstruction, install a desired tool, and use the mixing machine 1810.

It is known that mixing machines are heavy and unwieldy and therefore can be difficult to move around manually in a kitchen. It is also known that mixing machines generate a significant amount of energy and vibration when in use. Advantageously, a rollable support system such as rollable support system 1100 allows a user to roll the drawer system and the mixing machine 1810 across the countertop as desired. Also, rollable support system 1100 advantageously allows the user to retract the system's wheels to secure the system 1100 on the countertop surface while the mixing machine 1810 is being used, thereby preventing the rollable support system 1100 from slipping or moving on the countertop due to the vibrations caused by the mixing machine 1810.

After using the mixing machine 1810, the user may again lower the wheels 1350, roll the rollable support system 1100 and mixing machine 1810 back to their original location under the cabinet 1875, and retract the wheels 1350 to the raised position. The support system 1100 and mixing machine 1810 may in this manner be returned to their original location for storage until the next time the user wishes to use the mixing machine 1810.

While systems, apparatus, and methods disclosed herein are described in certain illustrative embodiments in connection with the use of a mixing machine, the systems, apparatus, and methods described herein may also be advantageously used in connection with the use of other types of devices including, without limitation, food processors.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. An apparatus comprising:
   first and second side portions, and a horizontal portion disposed between the first and second side portions, the horizontal portion having a top surface and a bottom surface;
   wherein each of the first and second side portions comprises:
      an inner wall joined to the horizontal surface, an exterior wall, and a top portion connected to the inner wall and to the exterior wall, wherein the inner wall, the exterior wall, and the top portion define a respective volume;
      first and second wheels disposed in the respective volume, the first and second wheels having a first wheel position in which no portion of the first and second wheels is below the bottom surface of the horizontal portion and a second wheel position in which a portion of each of the first and second wheels is below the bottom surface of the horizontal portion;
      an arm coupled to the respective side portion, the arm being disposed on an exterior of the exterior wall, the arm having a first arm position and a second arm position;
      a slot defined in the exterior wall, wherein a portion of the arm is adapted to move between a first location in the slot, the first location being associated with the first arm position, and a second location in the slot, the second location being associated with the second arm position;
      an exterior pivot disposed on the exterior of the exterior wall, wherein the arm is fixed on the exterior pivot and pivots on the exterior pivot from the first arm position to the second arm position;
      first and second interior pivots disposed on the interior of the exterior wall;
      a first lever disposed in the respective volume, the first lever coupled to the arm via the slot, the first lever being fixed on the first interior pivot and adapted to pivot on the first interior pivot, the first wheel being coupled to the first lever; and
      a second lever disposed in the respective volume, the second lever coupled to the arm via the slot, the second lever being fixed on the second interior pivot and adapted to pivot on the second interior pivot, the second wheel being coupled to the second lever;
      wherein movement of the arm from the first arm position to the second arm position causes the first and second levers to move, by pivoting on the first and second interior pivots, respectively, from a first lever position to a second lever position, thereby causing the first and second wheels to move from the first wheel position to the second wheel position.

2. The apparatus of claim 1, wherein the first lever and the second lever are coupled to the arm by a friction-generating element that is engaged in the slot.

3. The apparatus of claim 1, wherein:
   the side portion further comprises a pair of openings adapted to allow the first and second wheels to pass between the interior of the side portion and an exterior of the side portion.

4. The apparatus of claim 1, wherein the horizontal portion comprises:
   a pad;
   wherein a selected surface of the pad defines the bottom surface of the horizontal portion.

5. The apparatus of claim 4, wherein the pad comprises one of a plastic material, a foam material, and a cloth material.

6. A rollable support system comprising:
   a horizontal portion having a bottom surface and a top surface, the horizontal portion being adapted to hold an object on the top surface;
   first and second side portions joined to the horizontal portion, each side portion comprising:
      an inner wall, an outer wall, and a cover portion, the inner wall, outer wall, and cover portion defining a volume;
      a pair of wheels disposed within the volume, the pair of wheels comprising first and second wheels, the pair of wheels coupled to the respective outer wall of the respective side portion, the pair of wheels having a first wheel position in which the pair of wheels are higher than the bottom surface of the horizontal portion, and a second wheel position in which the pair of wheels are lower than the bottom surface of the horizontal portion;
      an arm coupled to the respective outer wall, on an exterior of the outer wall, the arm having a first arm position and a second arm position;
      a slot disposed in the respective outer wall, wherein the arm is engaged in the slot, the arm being adapted to move within the slot, the first arm position being associated with a first location in the slot and the second arm position being associated with a second location in the slot;
      first and second pivots disposed on an interior of the outer wall; and
      first and second levers engaged in the slot, the first lever being fixed to the first pivot, the second lever being fixed to the second pivot, wherein the first wheel is coupled to the first lever and the second wheel is coupled to the second lever, wherein the first and second levers are coupled to the arm;
      wherein movement of the arm from the first arm position to the second arm position causes the first and second levers to move, by pivoting on the first pivot and the second pivot, respectively, from a first lever position to a second lever position, wherein movement of the first and second levers causes the first and second wheels to move from the first wheel position to the second wheel position;
   wherein the rollable support system cannot roll on a surface when the pair of wheels coupled to the first side portion are in the first wheel position and the pair of wheels coupled to the second side portion are in the first wheel position;
   wherein the rollable support system is adapted to roll on the surface when the pair of wheels coupled to the first side portion are in the second wheel position and the pair of wheels coupled to the second side portion are in the second wheel position.

7. The rollable support system of claim 6, wherein each side portion further comprises:
   a friction-generating element engaged in the slot;
   wherein:
      the first and second levers are coupled to the friction-generating element; and
      the arm is coupled to the friction-generating element.

8. The rollable support system of claim 6, wherein the horizontal portion further comprises:
   a pad disposed on the bottom surface of the horizontal portion;
   wherein the respective pair of wheels is above a lower surface of the pad when the pair of wheels are in the first wheel position and the pair of wheels are below the lower surface of the pad when the pair of wheels are in the second wheel position.

9. The rollable support system of claim 8, wherein the pad comprises one of a plastic material, a foam material, and a cloth material.

\* \* \* \* \*